United States Patent [19]

Johnson

[11] 4,071,851
[45] Jan. 31, 1978

[54] METHOD OF ADJUSTING CAMERA WITH LATCHED SHUTTER BLADE MECHANISM FOR SHIPMENT

[75] Inventor: Bruce K. Johnson, Andover, Mass.

[73] Assignee: Polaroid Corporation, Cambridge, Mass.

[21] Appl. No.: 697,058

[22] Filed: June 17, 1976

[51] Int. Cl.$^2$ .................... G03B 19/02; G03B 9/08
[52] U.S. Cl. ............................. 354/354; 354/173; 354/204
[58] Field of Search ............. 354/204, 206, 213, 215, 354/230, 235, 173, 354, 281, 283

[56] References Cited

U.S. PATENT DOCUMENTS

| 3,932,878 | 1/1976 | Kurei | 354/204 X |
| 3,967,304 | 6/1976 | Johnson et al. | 354/173 X |
| 3,987,466 | 10/1976 | Murray, Jr. | 354/173 X |
| 3,995,295 | 11/1976 | Douglas | 354/235 X |
| 4,000,500 | 12/1976 | Ivester et al. | 354/281 X |

Primary Examiner—Edna M. O'Connor

Attorney, Agent, or Firm—Edward S. Roman

[57] ABSTRACT

The method of this invention is utilized by the manufacturer of a camera apparatus of the type having an automatic shutter latch mechanism, as well as an automatic film advancement mechanism to adjust the control system of the camera apparatus prior to the shipment so that even if the shutter latch mechanism is accidentally unlatched, the user will still be able to insert a film cassette into the film receiving chamber without incurring an automatic film advancement operation prior to closing the film loading access door. The method provides for the advancement of the camera control system through a portion of its photographic cycle by an external motor to a point in the cycle where a film unit would have otherwise been processed and advanced from the camera thereby insuring that the first time insertion of the film cassette within the camera by a user will not result in a film advancement operation if the automatic shutter latch mechanism should become unlatched during transit.

7 Claims, 23 Drawing Figures

FIG. I

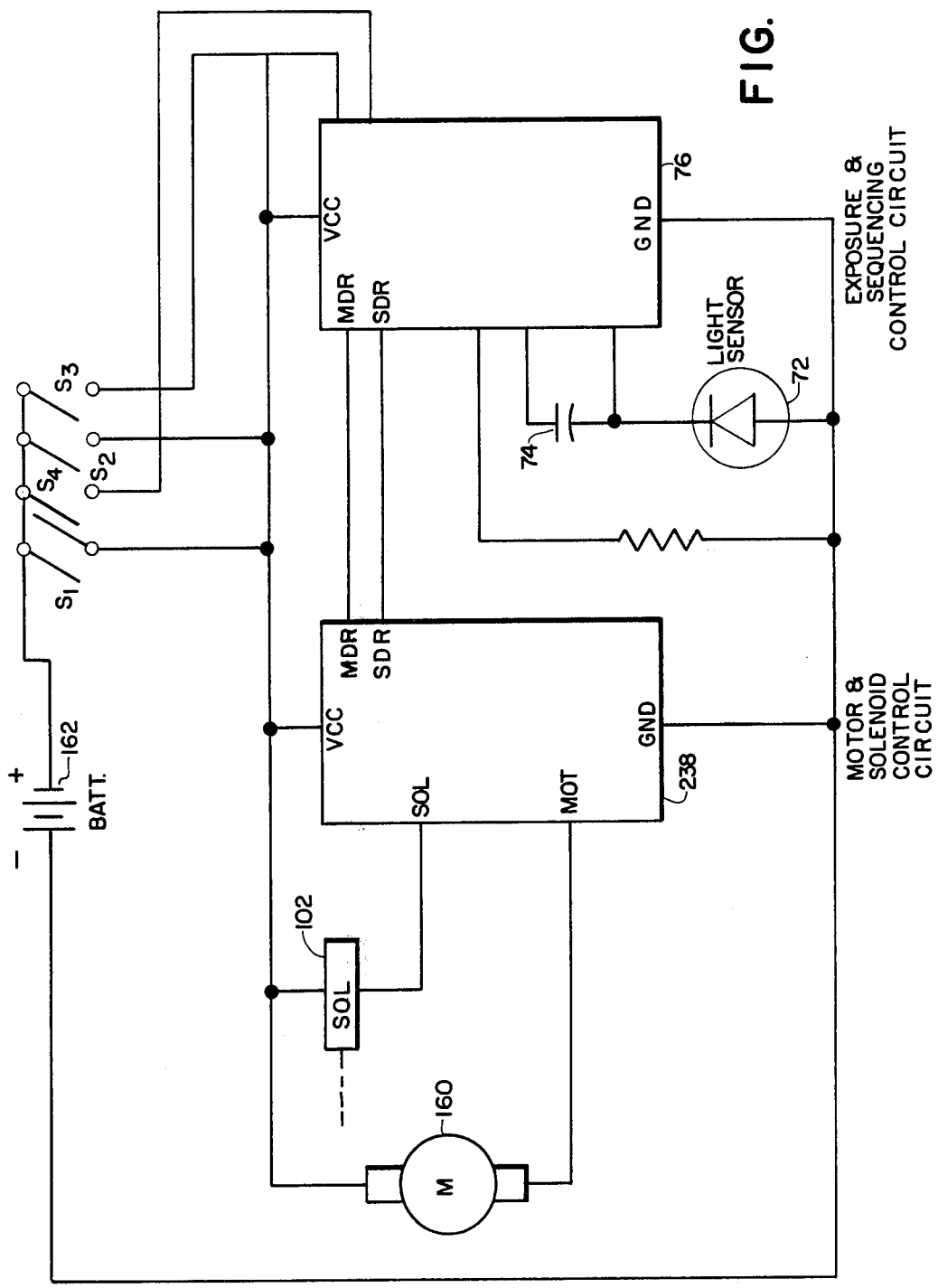

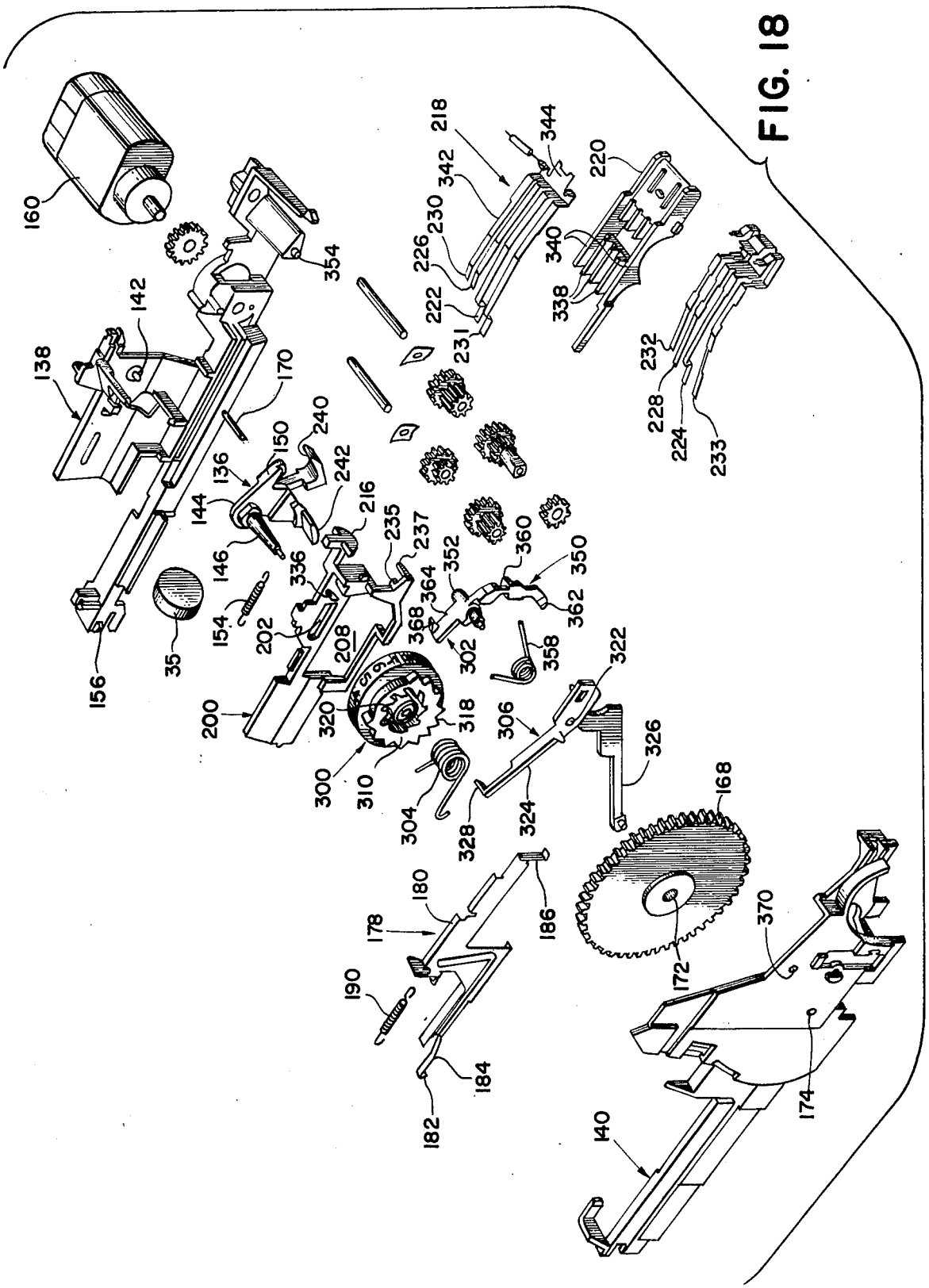

METHOD OF ADJUSTING CAMERA WITH LATCHED SHUTTER BLADE MECHANISM FOR SHIPMENT

BACKGROUND OF THE INVENTION

This invention relates generally to a method of adjusting a photographic camera for shipment, and more particularly, to a method of adjusting a photographic camera of the type having an automatic shutter latch in order to accommodate shipment under conditions in which the shutter latch may accidentally become unlatched.

Electrically driven exposure control systems are advantageous in that they minimize operator requirements of shutter recocking, etc. and are particularly suited for electronic control. For conservation of power, such systems require provision of a stable deenergized shutter condition when the camera is not undergoing exposure operations. An exemplary system of this type is described in U.S. Pat. No. 3,820,128 issued to J. P. Burgarella, et al on June 25, 1974 wherein a compact, automated single lens reflex camera is described, and which includes a shutter diaphragm system having shutter blades mechanically biased to an open (viewing) position and electrically biased to a closed position. Advantageously, the exposure system of the above-noted patent is electrically sequenced to provide a precise control over the exposure operation. That is, both the initiation and termination of the exposure interval are electrically, rather than mechanically, determined and, accordingly, may be precisely controlled. However, while the system is particularly adapted for through the lens viewing and provides a normally open shutter, it can be understood that it would also be desirable to provide a normally closed arrangement without compromising the system advantages.

Toward this end, there is described in a copending application for U.S. Pat. Ser. No. 554,777 entitled "Photographic Apparatus With Sequencing System", by B. Johnson and G. Whiteside, filed Mar. 3, 1975, a latching mechanism provided in order to maintain the shutter blade mechanism in its light blocking position without having to maintain a solenoid in its energy consuming energized state. The means described in the aforementioned patent application for latching and unlatching the shutter blade mechanism comprises a forwardly extending finger arranged for reciprocal movement in correspondence with a film advancing mechanism. The finger is adapted to extend into the locus of movement of the blade mechanism when the film advance mechanism is in its forwardmost position. The shutter blade elements are of the so-called "scanning type" embodying a pivotal walking beam whereby the forward end of the finger provides a rearwardly movable stop, in the path of travel, against which the lower end of the walking beam abuts to prevent clockwise rotation of the walking beam under the influence of a biasing spring. The shutter blade mechanism is unlatched in response to the predetermined rotation of the sequencing gear which causes the film advance mechanism and its associated finger latch to move rearwardly under the influence of another biasing spring. This rearward movement retracts the finger from the path of travel of the walking beam thereby permitting rotation of the beam about its pivot towards the shutter open position. During the course of the cycle of camera operation, the film advance mechanism again moves forwardly to cause the finger to extend through the locus of rotation of the walking beam to relatch the shutter thereby allowing the solenoid to be deenergized.

Another exposure control system utilizing electrically controlled shutter blade elements employing a latch for holding the blades in a light blocking position is more fully described in a copending application for U.S. Pat. No. 3,995,292, entitled "Electro-Mechanical Shutter System Having Mechanical Latch", by L. Douglas, issued Nov. 30, 1976. In accordance with the general concept of the aforementioned invention, the exposure control system includes a reliable shutter latching arrangement which requires shutter actuation for release. Thus, the exposure control system includes a shutter latch released in response to combined electrical and mechanical actuation of the exposure control system. A mechanical shutter latch arrangement is unlocked just before or simultaneously with energization of the exposure control system and then subsequently released in response to initial shutter blade movement resulting from energization of the electrical drive element.

Another shutter latch arrangement is shown in a copending application for U.S. Pat. Ser. No. 648,725, now U.S. Pat. No. 4,040,072, entitled "Solenoid Released Motor Recocked Shutter Latch System" by B. K. Johnson and G. D. Whiteside filed Jan. 13, 1976 which discloses an automatic shutter latch mechanism which may be released in response to initial shutter blade movement resulting from energization of the shutter drive means and which may thereafter be moved into position to relatch the shutter blade in response to film advancement. In addition the aforementioned shutter latch mechanism also responds to initial shutter blade movement resulting from manually actuated energization of the electrical shutter drive means for unlatching the shutter blades while simultaneously actuating a power interlock switch to maintain the electrical energization of a photographic exposure control system subsequent to the manual deactuation thereof by the user. This shutter latch mechanism additionally includes a shock-damping arrangement for inhibiting the accidental unlatching of the shutter blade mechanism resulting from shutter blade movement occasioned through extraneous vibration, sudden shock or otherwise. It is to this automatic shutter latch mechanism that the process and method of the instant invention is directed.

Although a shock-damping arrangement is provided to inhibit the accidental unlatching of the shutter blade mechanism, there may nevertheless occur an accidental unlatching under severe or repeated shock. The problem may be particularly acute when the cameras are shipped from their place of manufacture, at which time there may be expected to occur severe shocks during transit.

Therefore it is a primary object of the method of this invention to provide a method for adjusting the control system of the camera apparatus prior to shipment so that even if the latching mechanism is accidentally unlatched during shipment, the user will still be able to insert a film cassette into the camera film receiving chamber without incurring any adverse effects.

Other objects of the invention will in part be obvious and will in part appear hereinafter.

SUMMARY OF THE INVENTION

The process of this invention relates to a method for adjusting an automatic latchable exposure control system in a photographic camera apparatus to facilitate the automatic operation of the exposure control system subsequent to the shipment thereof after manufacture during which time it might incur a sudden shocking otherwise resulting in the exposure control system becoming unlatched. The photographic apparatus is of the type having: an automatic latchable shutter mechanism, drive means including at least one motor driven gear for performing at least one operation relative to the implementation of a photographic exposure cycle including the advancement of a film unit from its exposure plane as well as the automatic relatching of the shutter mechanism, a ratchet wheel drivably engaged by the motor driven gear for limited rotation in a select direction from a predetermined position together with means for returning the ratchet wheel to its predetermined position responsive to the camera assuming an unloaded condition with respect to film prior to the automatic relatching of the shutter mechanism, and a manually actuable shutter button for initiating the photographic exposure cycle. The shutter button is arranged to assume a select position responsive to the camera apparatus being in an unloaded condition with respect to film whereupon the shutter button is moved from the select position responsive to limited rotation of the ratchet wheel in the select direction from its predetermined position and thereafter returned to its select position when the camera is in an unloaded condition with respect to the film. The first step of the method provides for stationing a drive apparatus in driving engagement with the camera drive means and thereafter effecting the operation of the drive apparatus so that the drive means at least performs its one operation relative to the implementation of a photographic exposure cycle including the film advancement operation as well as the limited rotation of the ratchet wheel, but not the automatic relatching of the shutter mechanism. The next step involves monitoring the position of the shutter button in a manner which will detect movement of the shutter button from the select position responsive to limited rotation of the ratchet wheel in the select direction from the predetermined position and which will additionally detect movement of the shutter button back to the select position responsive to the return of the ratchet wheel back to its select position when the camera is in an unloaded condition with respect to film. The last step involves terminating the operation of the drive apparatus in response to detection of shutter button movement back to the select position prior to the automatic relatching of the shutter mechanism. The drive apparatus is thereafter removed from driving engagement with the camera drive means. In this manner, subsequent shocking of the camera to a degree which might result in the shutter latch mechanism becoming unlatched during shipment does not interfere with subsequent camera use which automatically effects a relatching of the shutter mechanism.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 10 is a front cross-sectional view of a portion of the automatic shutter latch of FIG. 2 in a different mode of operation;

FIG. 11 is a schematic diagram of the electronic exposure control system of the camera of FIG. 1;

FIG. 12 is a front cross-sectional view of a portion of the automatic shutter latch of FIG. 2 in still another mode of operation;

FIG. 18 is an exploded perspective view showing a portion of the automatic shutter latch mechanism of the camera of FIG. 1.

DESCRIPTION OF THE PREFERRED EMBODIMENT

Figure 1:
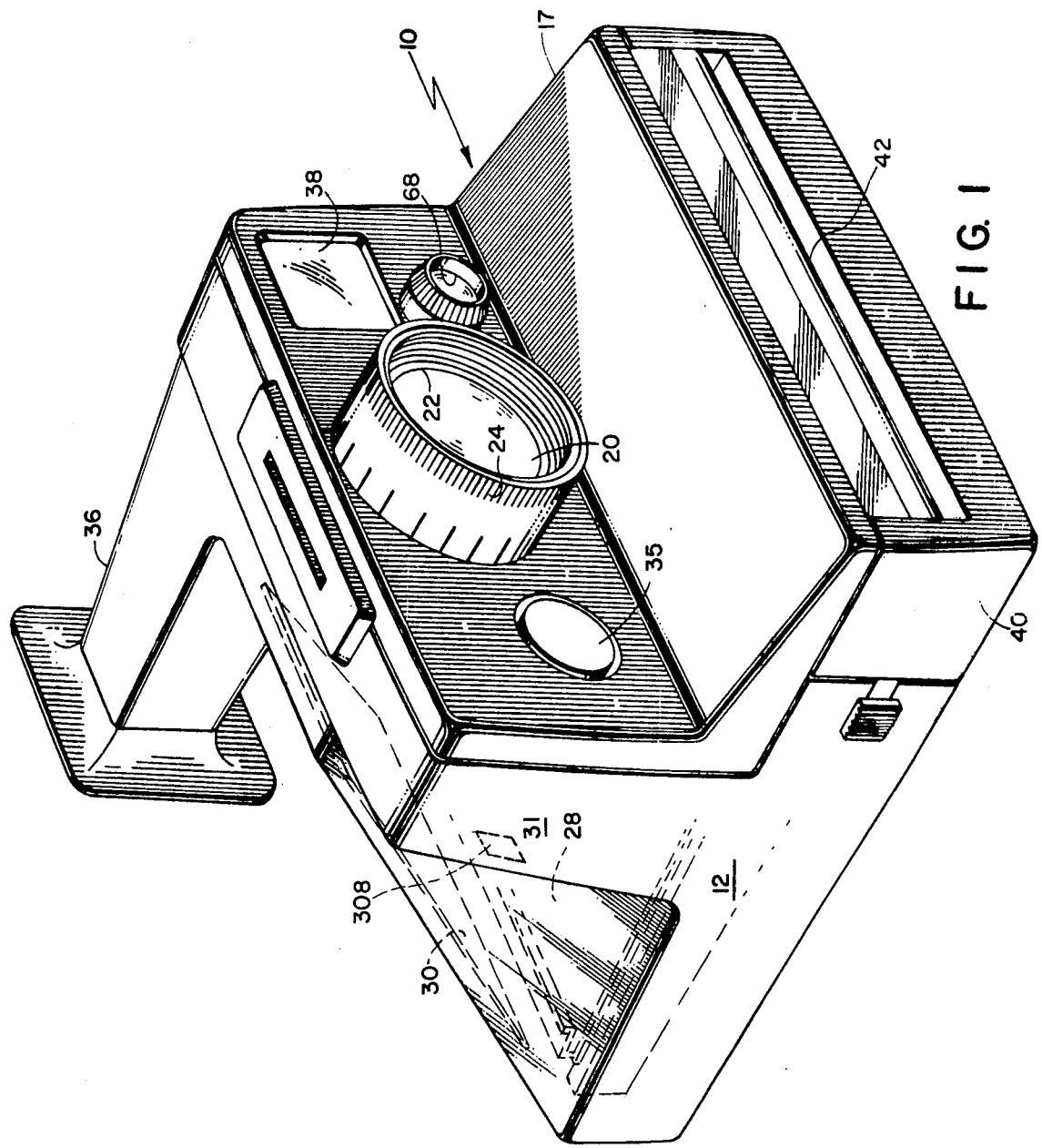
FIG. 1 is a perspective view of a photographic camera apparatus embodying an automatic shutter latch mechanism as adjusted in accordance with the method of this invention.
Figure 2:
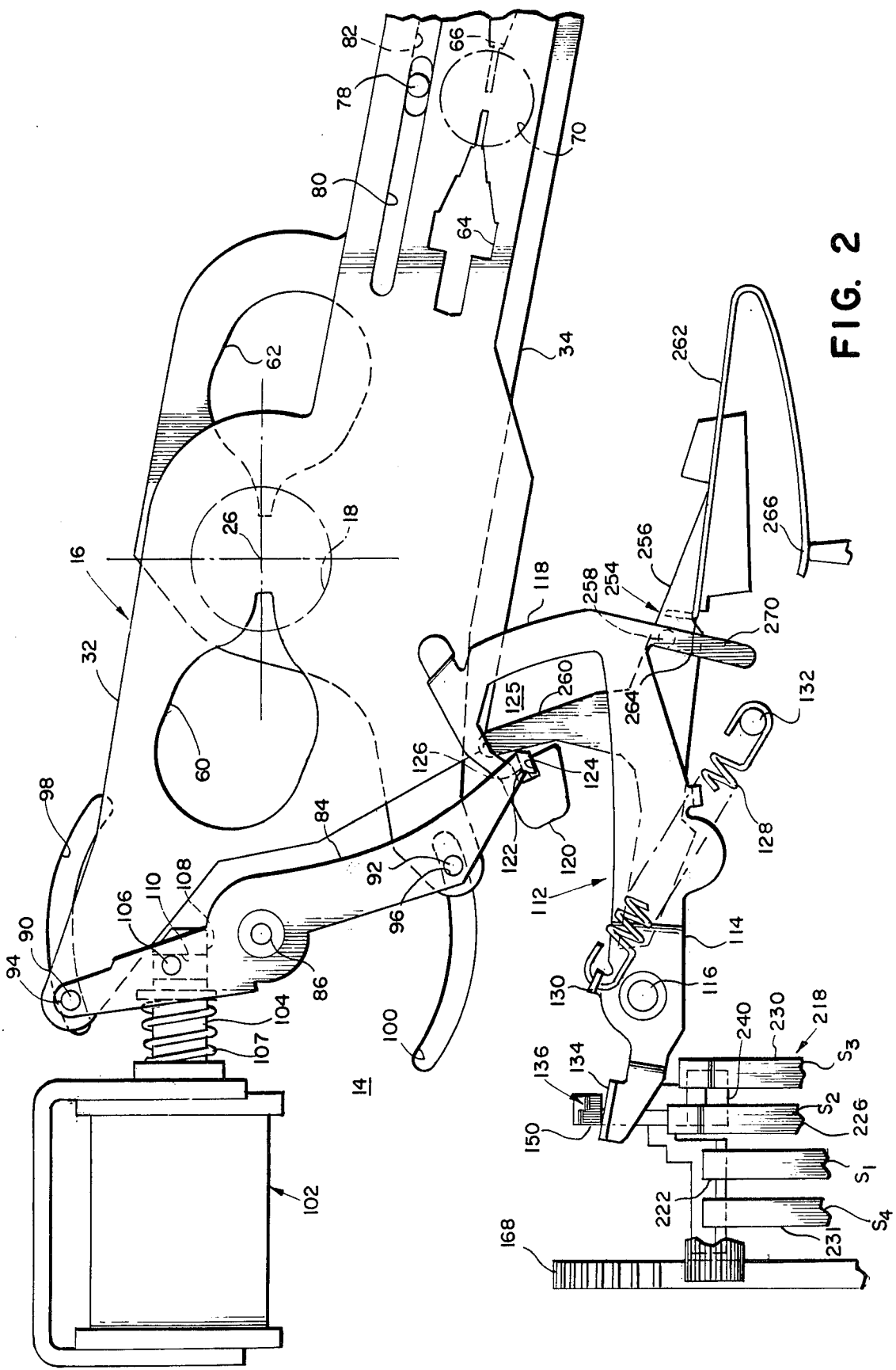
FIG. 2 is a front cross-sectional view of a portion of the automatic shutter latch mechanism in the camera of FIG. 1.

Referring now to FIGS. 1 and 2, there can be seen an exposure control system associated with a photographic apparatus 10 contained within a housing shown generally at 12. A baseblock casting 14 is fixedly stationed within the housing 12 and selectively machined to support the various components of an exposure mechanism shown generally at 16. Surrounding the front and top of the baseblock casting 14, there is provided a cover section 17 which includes at least one opening through which extends a manually adjustable focus bezel 24. Centrally disposed within the baseblock casting 14, there is provided a light entering exposure opening 18 which defines the maximum available exposure aperture for the system.

Figure 3:
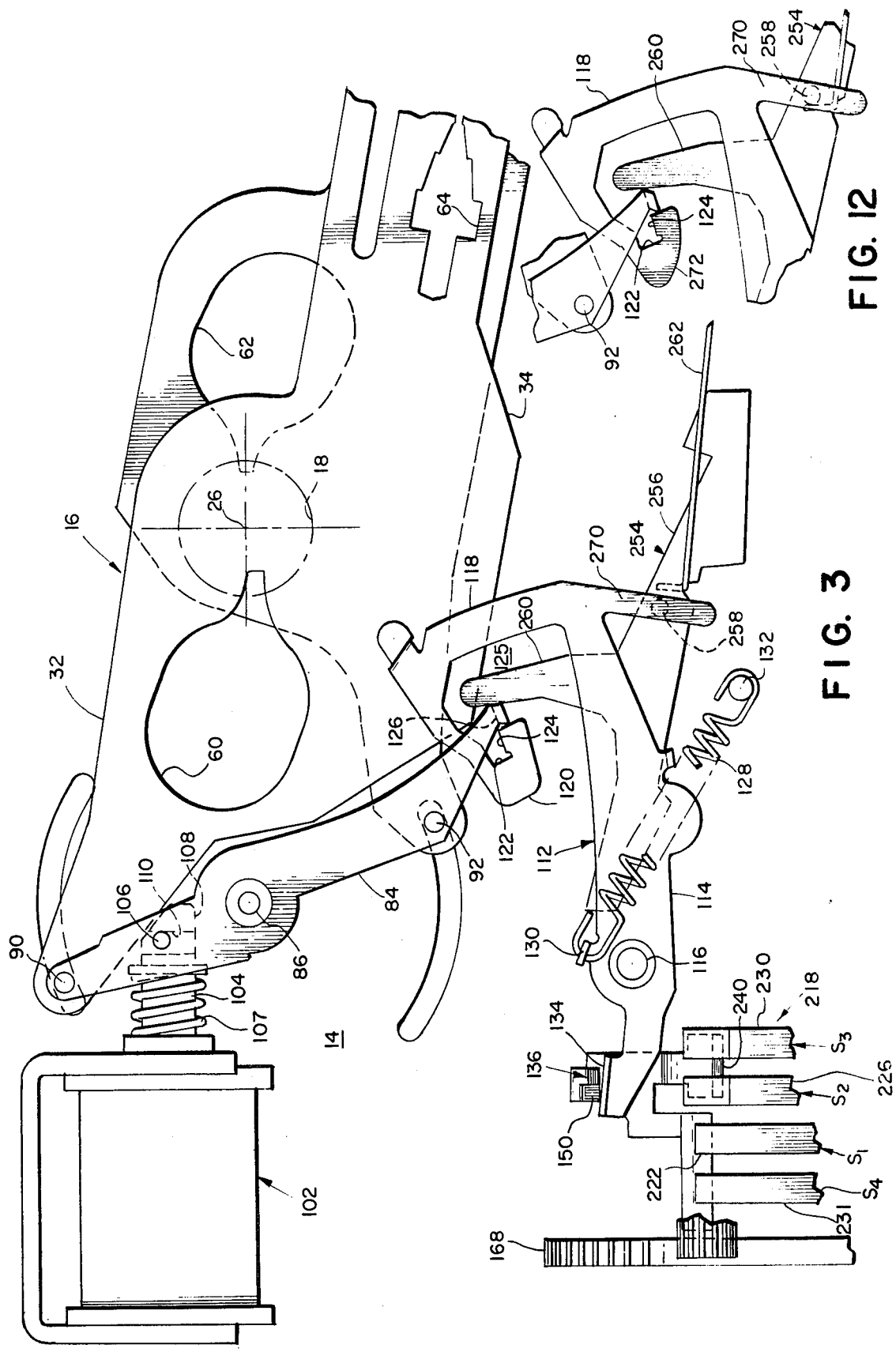
FIG. 3 is a front cross-sectional view of the automatic shutter latch mechanism of FIG. 2 in a different mode of operation.
Figure 4:
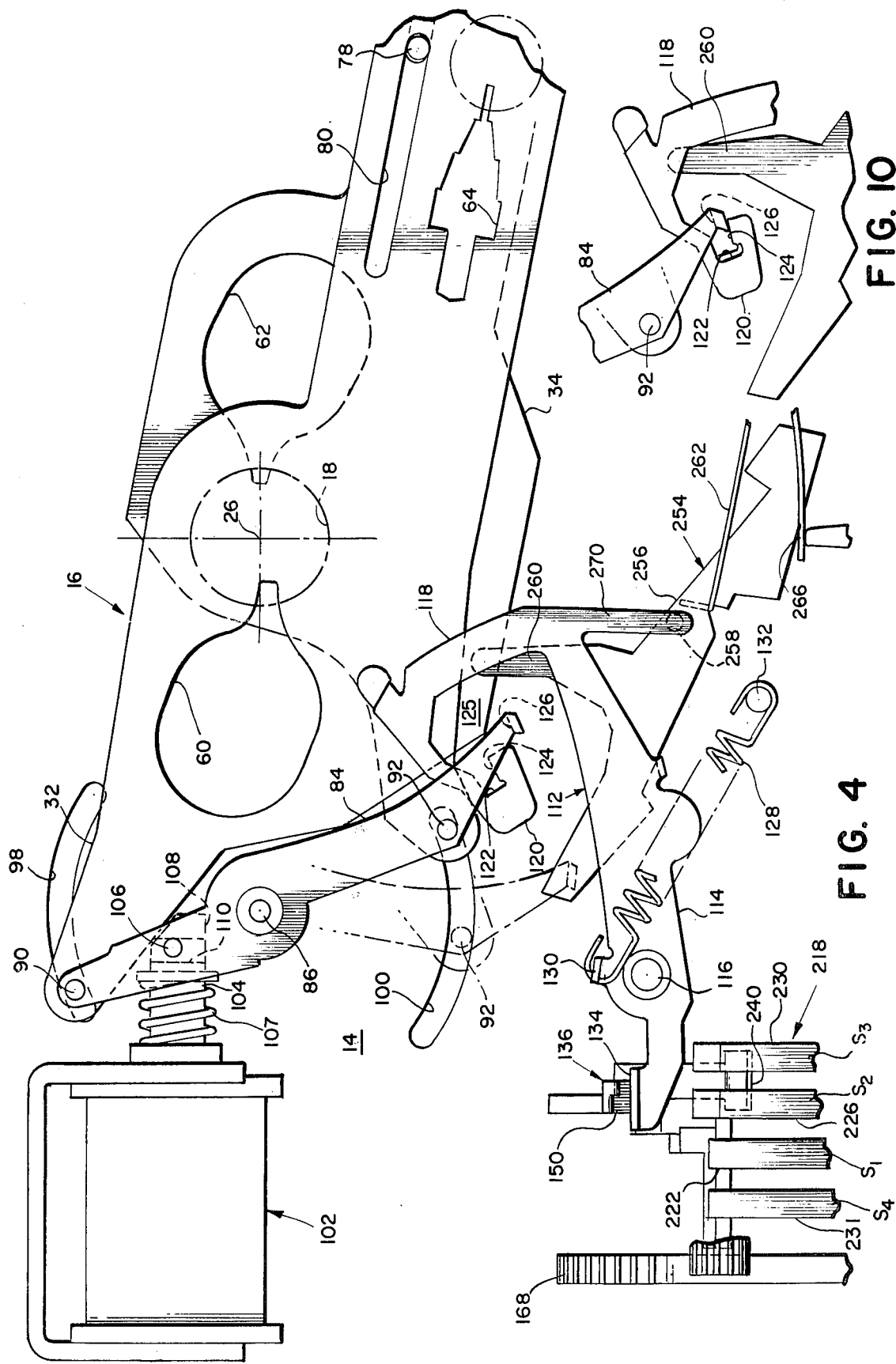
FIG. 4 is a front cross-sectional view of the automatic shutter latch mechanism of FIG. 2 in still another mode of operation.
Figure 5:
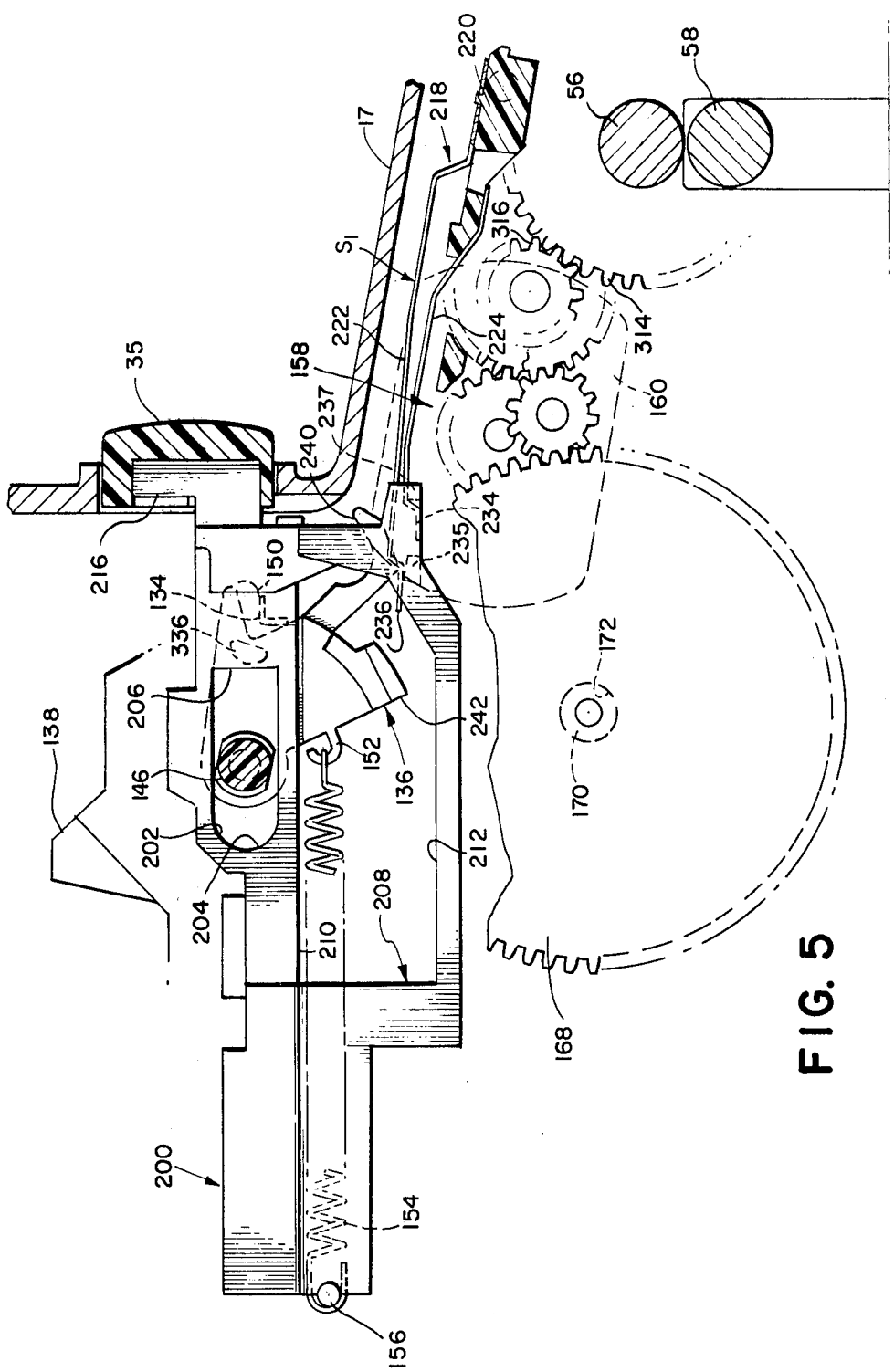
FIG. 5 is a side cross-sectional view of a portion of the automatic shutter latch mechanism of FIG. 2 including related apparatus for processing and advancing film units from the photographic apparatus.

An objective or taking lens 20 is provided in overlying relation to the light entering opening 18 wherein the objective lens 20 may comprise a plurality of elements retained in predetermined spaced relation by a cylindrical lens mount 22 which is externally threaded for toothed engagement within the internally threaded focus bezel 24. As is readily apparent, focus bezel 24 is made rotatable with respect to the front cover section 17 to provide translational movement of the elements of lens 20 along the center axis 26 of the optical path of the housing 12. As is readily apparent, the central optical axis 26 is illustrated in FIGS. 2–4 as being normal to the plane of the drawing. Thus, rotation of focus bezel 24 may be carried out by manual rotation to provide displacement of the elements of objective lens 20 for focusing of image carrying rays through the light entering exposure opening 18 to a rearwardly positioned film plane 28 by way of a reflecting mirror 30 all of which are stationed within a suitable light tight film exposure chamber 31 within the housing 12.

Intermediate the objective lens 20 and light entering exposure opening 18, there is provided a shutter mechanism including two overlapping shutter blade elements 32 and 34 of the so-called "scanning type" which will be subsequently described in greater detail herein. Extending from the front cover section 17, there is provided a photographic cycle initiating button 35, the depression of which commences the exposure interval by ultimately effecting the release of the shutter blade elements 32 and 34 in a manner to be subsequently described herein.

The housing section 12 may include an integrally molded viewfinder housing 36 extending rearwardly from the front cover section 17. The viewfinder housing 36 affords protection to internal components positioned therein and enables a user to use and frame a desired subject or scene through a window 38 included within the front cover section 17.

Figure 6:
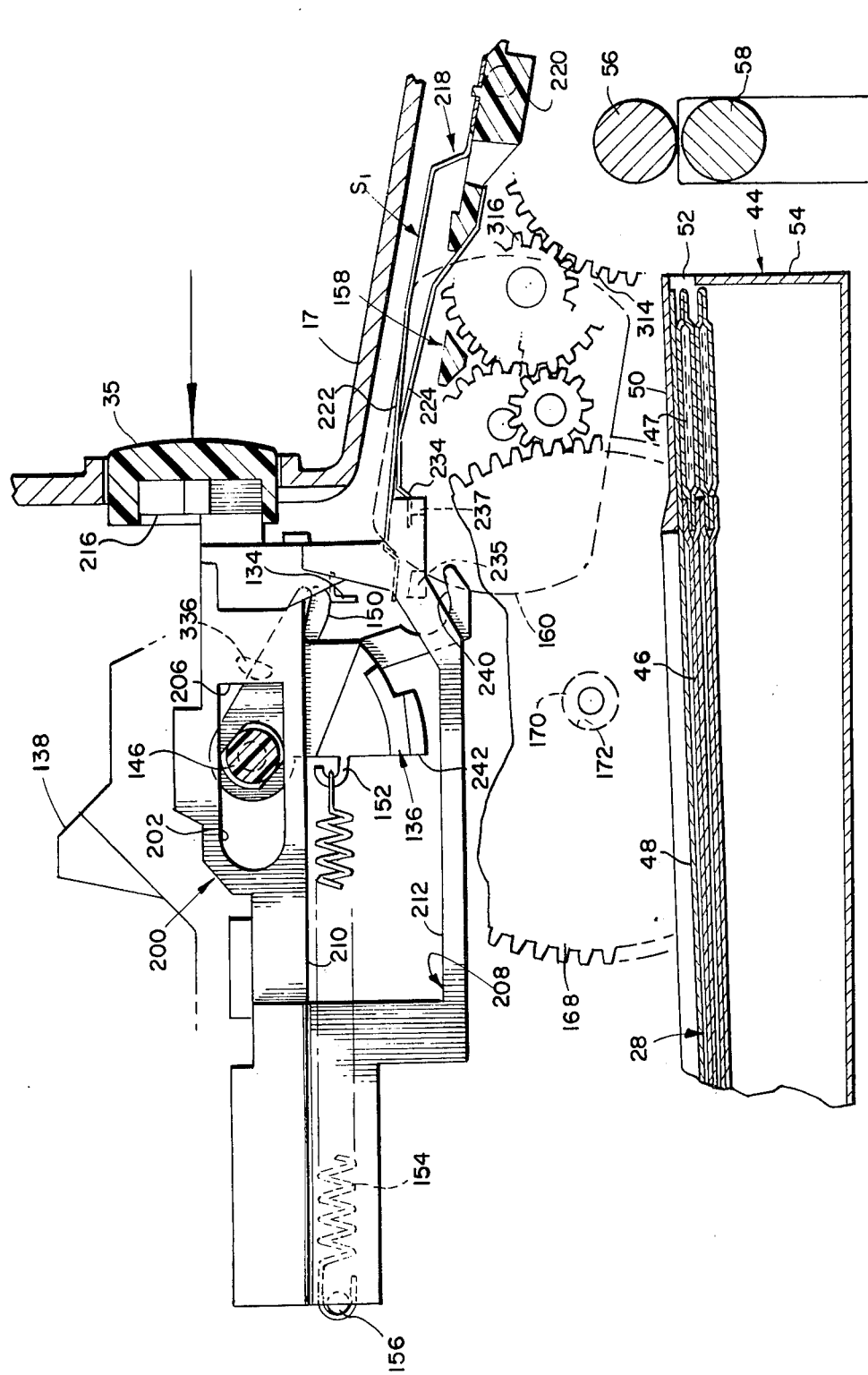
FIG. 6 is a side cross-sectional view of the portion of the automatic shutter latch mechanism as shown in FIG. 5 in a different mode of operation.
Figure 7:
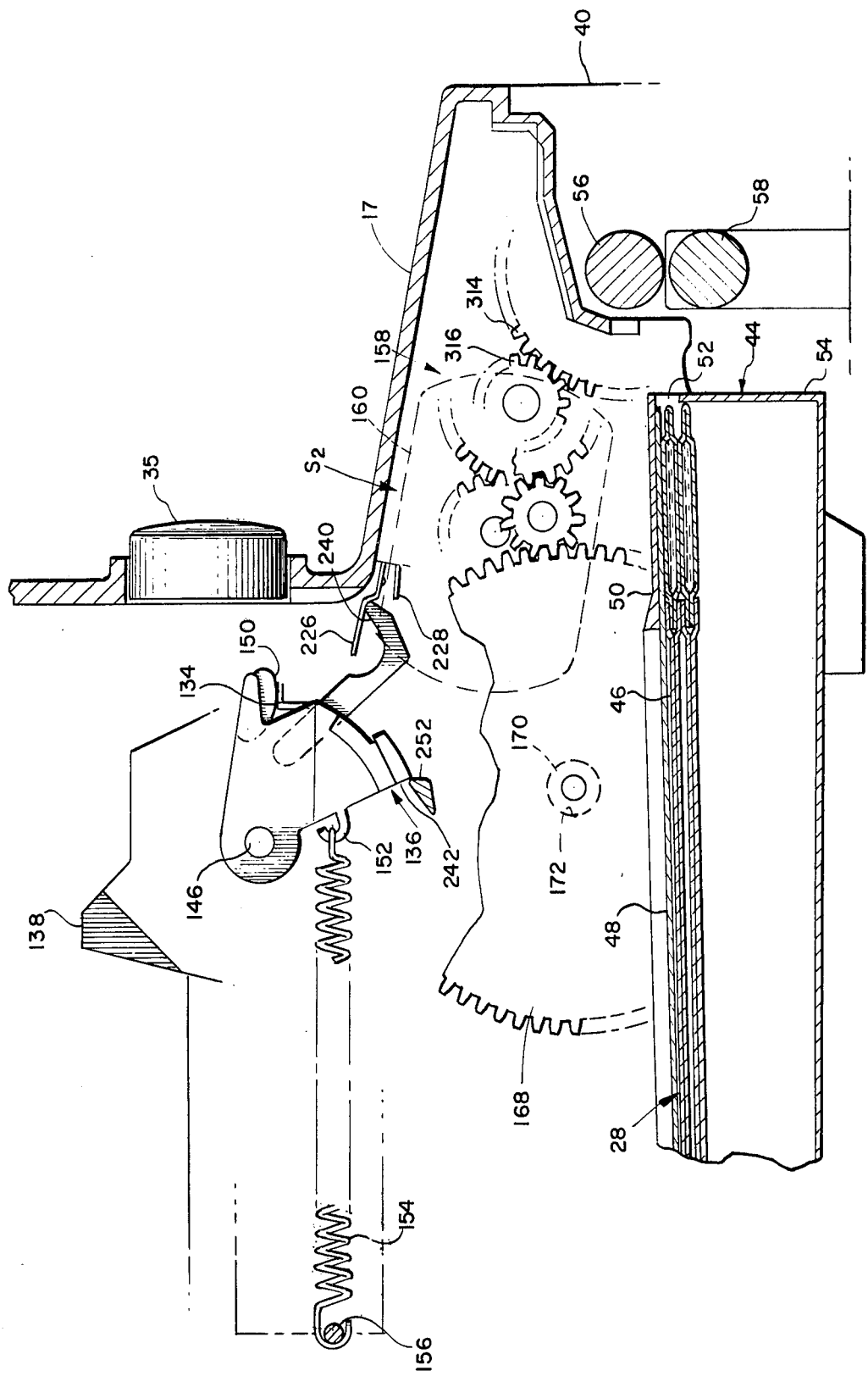
FIG. 7 is a side cross-sectional view of another portion of the automatic shutter latch mechanism of FIGS. 2 and 5.

A film loading access door 40 including a film withdrawal slot 42 transversely disposed therein is pivotally mounted for movement between positions blocking and unblocking an open end of the chamber 31 included within the housing 12 for receiving and supporting a film cassette or container 44 therein as shown in FIGS. 6 and 7. The cassette 44 encloses an assemblage including a plurality of film units 46 and a dark slide 48 superpositioned thereto for preventing exposure of a forwardmost film unit prior to insertion of the film cassette 44 into the chamber 31.

The film units 46 are multilayered structures including one or more photosensitive image receiving layers arranged in superposed relation and a rupturable pod 47 containing a supply of fluid processing composition attached to a leading end of the film unit 46. The film cassette 44 including the assemblage is similar to that disclosed and defined in U.S. Pat. No. 3,874,875, issued to E. H. Land on Apr. 1, 1975. The film units 46 included in the assemblage represent a general class of "integral type" self-developing type film units similar to that described in U.S. Pat. No. 3,415,644 issued to E. H. Land on Dec. 10, 1968. The film cassette 44 is shown in position within the film receiving chamber 31 of the camera 10 in FIGS. 6 and 7. The cassette 44 has a general tapered rectangular shape having a forward wall 50 including an exposure aperture therein which is generally coextensive with the photosensitive area of the underlying film unit 46 contained within the cassette 44. Once the cassette 44 has been properly positioned within the chamber 31, the dark-slide cover 48 must be removed prior to commencing a first photographic cycle whereupon the forwardmost film unit 46, subsequent to exposure, is advanced through an elongated film exit slot 52 disposed transversely within a leading end wall 54 of the film cassette 44. As the forwardmost member advances through the exit slot 52, it enters into the bite of a pair of juxtaposed pressure applying members or rollers 56 and 58 mounted adjacent the film withdrawal slot 42.

Figure 8:
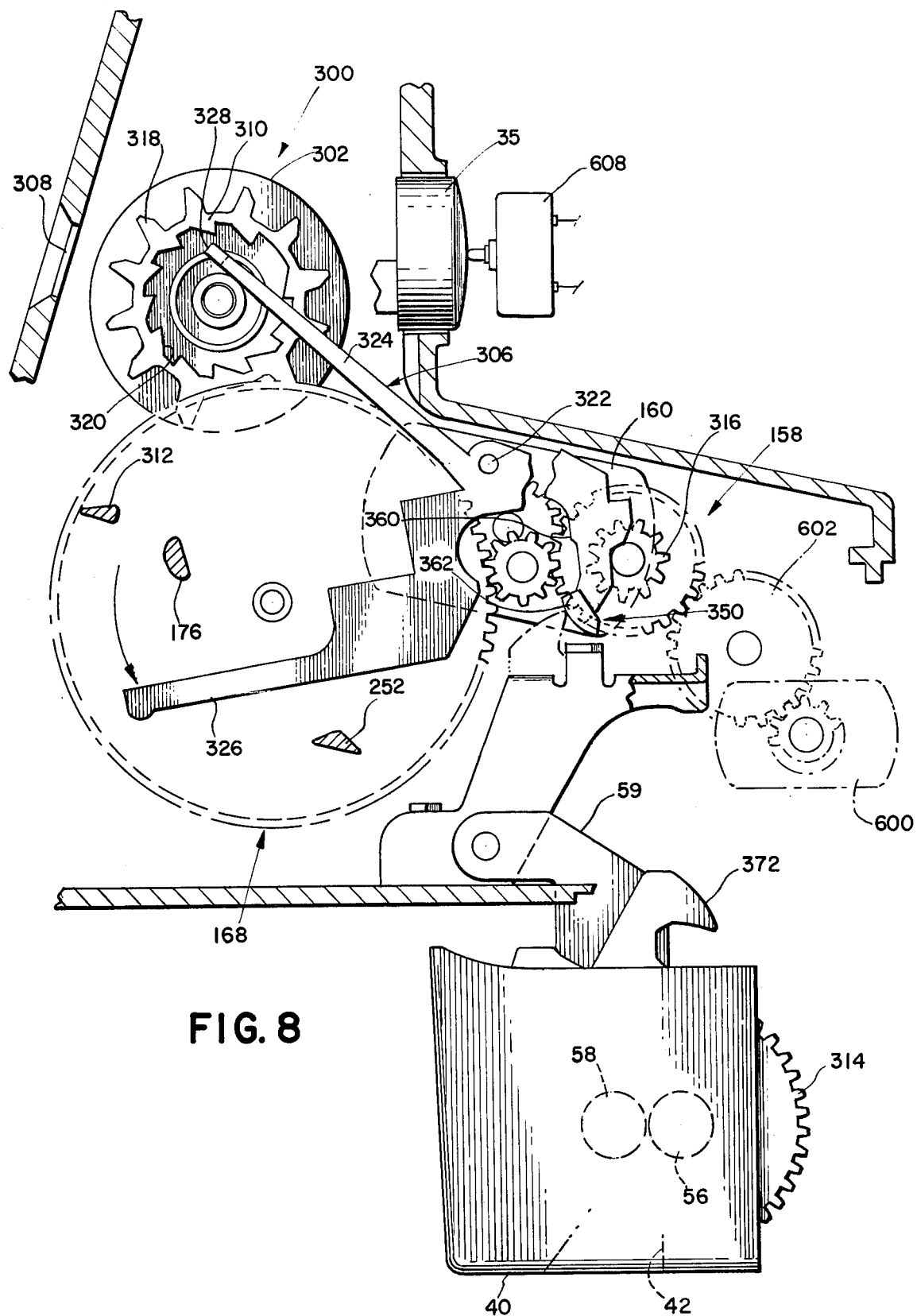
FIG. 8 is a cross-sectional view of still another portion of the automatic shutter latch mechanism of FIGS. 2 and 5 showing related apparatus for indexing the number of spent film units.

The film loading access door 40 is pivotally connected to housing section 12 by parallel spaced apart hinges, one of which is shown at 59, so as to allow the access door 40 and the rollers 56 and 58 to be pivoted downwardly as shown in FIG. 8 to provide access to the film receiving chamber 31 for loading and unloading a film cassette 44. A detailed description of the manner in which the film loading access door and rollers 56 and 58 are coupled to the remainder of the camera 10 may be found in U.S. Pat. No. 3,974,510, issued Aug. 10, 1976, in the name of Andrew S. Ivester entitled "A Mounting Apparatus for A Spreader Roller Assembly." The rollers 56 and 58 are suitably mounted within the access door 40 by a mounting bracket (not shown).

A pair of scene light admitting primary apertures 60 and 62 are provided respectively in the blade elements 32 and 34 to collectively define a progressive variation of effective aperture openings in accordance with simultaneous longitudinal and lateral displacement of one blade element with respect to the other blade element in a manner as is fully described in a U.S. Pat. Ser. No. 3,942,183 entitled "Camera With Pivoting Blades" by George D. Whiteside, issued Mar. 2, 1976 and assigned in common herewith. The apertures 60 and 62 are selectively shaped so as to overlap the light entering exposure opening 18 thereby defining a gradually varying effective aperture size as a function of the position of the blade elements 32 and and 34.

Each of the blades 30 and 32 may additionally be configured to have corresponding photocell sweep secondary apertures shown respectively at 64 and 66. Secondary apertures 64 and 66 may be configured in correspondence with the shapes of scene light admitting primary apertures 60 and 62. As is readily apparent, the secondary apertures 64 and 66 also move in correspondence with the primary apertures 60 and 62 to define a small secondary effective aperture for admitting the passage of scene light transmitted through a photocell aperture 68 in front cover section 17 of housing 12, from the scene being photographed.

Scene light admitted by the photocell secondary apertures 64 and 66 is thereafter directed to a light detecting station shown generally at 70. The light detecting station includes a photoresponsive element 72 (see FIG. 11) which cooperates with a light integrating capacitor 74 together with light integrating and control circuitry 76 as is more fully described in a copending application for U.S. Pat. Ser. No. 619,384 entitled "Exposure Control System With Fill-Flash Race Condition" by E. K. Shenk, filed Oct. 3, 1975. In this manner, the exposure interval can be terminated as a function of the amount of light received through the secondary effective aperture defined by the overlapping photocell sweep apertures 64 and 66.

Projecting from the baseblock casting 14 at a location spaced laterally apart from the light entering exposure opening 18, is a pivot pin or stud 78 which pivotally and translatably engages elongate slots 80 and 82 formed in respective shutter blade elements 32 and 34. Pin 78 may be integrally formed with the baseblock casting 14 and blade elements 32 and 34 may be retained in engaging relation with respect to the pin 78 by any suitable means such as peening over the outside end of pin 78.

The opposite ends of the blade elements 32 and 34 respectively include extended portions which pivotally connect to a walking beam 84. Walking beam 84, in turn, is disposed for rotation relative to the baseblock casting 14 by pivotal connection to a projecting pivot pin or stud 86 which may be integrally formed with the baseblock casting 14 at a location spaced laterally apart from the light entering exposure opening 18. The walking beam 84 may be pivotally retained with respect to the pin 86 by conventional means such as an E ring (not shown). In the preferred mode, the walking beam 84 is pivotally connected at its distal ends to the shutter blade elements 32 and 34 by respective pin members 90 and 92 which extend laterally outward from the walking beam 84. Pin members 90 and 92 are preferably circular in cross section and extend through respective circular openings 94 and 96 in respective blade elements 32 and 34 so as to slidably engage respective arcuate slots or tracks 98 and 100 which may be integrally formed within the baseblock casting 14. The arcuate tracks 98 and 100 operate to inhibit disengagement of the blade elements 32 and 34 from their respective pin members 90 and 92 during operation of the exposure control system. Thus, the walking beam 84 and shutter blade elements 32 and 34 collectively define a blade mechanism with the means for mounting the blade mechanism for displacement including pivot pins 78 and 86.

Drive means for displacing the blade mechanism include a tractive electromagnetic device in the form of a solenoid 102 employed to displace the shutter blades 32 and 34 with respect to each other and the casting 14. The solenoid 102 includes an internally disposed cylindrical plunger unit 104 which retracts inwardly into the body of the solenoid upon energization of the solenoid winding. The solenoid plunger 104 includes an end cap 108 at the outside end thereof together with a vertical slot or groove 110 within the end cap 108 for loosely engaging a pin 106 extending outwardly from the walking beam 84. In this manner, the solenoid plunger 104 is affixed to the walking beam 84 so that longitudinal displacement of the plunger 104 will operate to rotate the walking beam around the pivot pin 86 so as to appropriately displace the shutter blades 32 and 34. The drive means may additionally include a helical compression spring 107 around the plunger 104 so as to continuously urge the end cap 108 outward of the solenoid 102 thereby also continuously urging the blade elements 32 and 34 into positions defining their largest effective aperture over the light entry and exposure opening 18. As will be readily understood, in some shutter blade arrangements it may be preferable to utilize a tension spring in place of compression spring 107 in a manner as shown in U.S. Pat. Ser. No. 3,942,183, entitled "Camera With Pivoting Blades" issued Mar. 2, 1976, Supra. Thus, with the spring connection herein described, the exposure control system of this invention is biased to continuously urge the shutter blade elements 32 and 34 into an open orientation.

In the present arrangement, the shutter blades 32 and 34 are drawn from their open position to their closed position as shown in FIGS. 2-4 when the solenoid 102 is energized. Consequently, energization of solenoid 102 prevents the shutter blades 32 and 34 from moving towards their maximum aperture opening under the urging of compression spring 107. However, as should be readily understood, the exposure control system of this invention would be equally applicable to photographic systems where the blades 32 and 34 are spring biased in a normally closed position.

Referring now to FIGS. 2-4, there is shown generally at 112 latch means including a latch member having an elongated main body portion 114 disposed for rotation about a pivot pin or shaft 116 integrally molded with the baseblock casting 14. The main body portion 114 includes an integral arm portion 118 extending outwardly therefrom into overlapping relation therewith to ultimately define an integral hook portion 120. Hook portion 120 is adapted for releasable engagement with an integrally molded pin member 126 extending laterally outward from the side of walking beam 84. More specifically, hook portion 120 defines a first edge surface 122 which engages pin member 126 so as to inhibit clockwise rotation of walking beam 84 about pin 86. In addition, hook portion 120 defines a second edge surface 124 which engages the bottom of pin member 126 to inhibit counterclockwise rotation of latch member 112 about its pivot pin 116. A latch release slot is shown generally at 125 and accommodates release of the walking beam 84 from the hook portion 120 in a manner to be subsequently described. Latch member 112 is resiliently biased for yieldable clockwise rotation about pivot pin 116 by a tension spring 128, one end of which engages an integral hook portion 130 extending laterally outward from the main body portion 114 of the latch member 112. The other end of tension spring 128 is grounded with respect to the baseblock casting 14 by a pin member 132.

Referring now to FIGS. 5-8, and 18 there is shown actuator member 136 rotatably disposed between a pair of spaced apart first and second side mounting members 138 and 140. The first and second side members 138 and 140 may be joined together by suitable means to provide a subassembly of components in the following manner. The first side mounting member 138 includes a laterally extending, integrally molded shaft 142 for rotatably mounting the actuator 136 thereon. The shaft 142 extends through a center bore 144 in the actuator 136 wherein the bore 144 is disposed in general concentric relation to an integrally molded shaft 146 extending laterally outward from the actuator member 136. The outside end of shaft 146 is inserted for rotation within a receiving aperture on the second side mounting member 140. The actuator arm member 136 additionally includes a laterally extending, integrally molded arm portion 150 which is resiliently biased into engagement with an edge surface 134 of the main body portion 114 of latch 112. Resilient bias is applied to the actuator member 136 for urging rotation thereof in a clockwise direction as viewed in FIGS. 6 and 7 by means of a tension spring 154, one end of which connects to an integrally molded hook portion 152 from the actuator member 136 and the other end of which is connected to a pin 156 which extends laterally outward from a slider member 200 to be subsequently described in greater detail herein.

An exposure character 300 including an indicia-bearing member 302, a helical spring 304, a film cassette pawl 306, and a ratchet wheel 310, is shown in exploded fashion in FIG. 18. The exposure character 300 is disposed for rotation about the shaft 146 from actuator 136 between the first and second side mounting members 138 and 140. The indicia-bearing member 302 includes a plurality of spaced apart identifying characters around the outside peripheral face thereof for visually indicating through a window 308 in the housing 12 the number of film units 46 included within the camera 10. The exposure counter 300 is stationed in an initial predetermined starting position when a new film-laden cassette 44 is inserted into the film receiving chamber 31. Once the dark side cover 48 has been removed and passed through the film withdrawal slot 42 of the loading access door 40, the indicia-bearing member 302 is indexed in a manner to be subsequently described and the character designating the number of the forwardmost film unit to be exposed, or put another way, the number of film units remaining in the film cassette 44, is presented at the window 308. As each exposure of the underlying film unit is made, the indicia-bearing member 302 is sequentially indexed in a counterclockwise direction as viewed in FIG. 8 and the character or numeral indicating the number of remaining film units is changed and descends one digit per exposure cycle until the indicia-bearing member 302 is moved into a final position where it indicates that the film cassette is empty.

A sequencing or timing gear 168 is also rotatably disposed intermediate the first and second side mounting members 138 and 140. The sequencing gear 168 includes a center bore 172 therethrough disposed for rotation about an integrally molded shaft 170 extending laterally outward from the first side mounting member 138 into engagement with the receiving aperture 174 in the second side member 140. The timing gear 168 includes a first drive pin 312 (see FIG. 8) on the inwardly facing surface thereof in position to engage the ratchet wheel 310 included upon the side of the indicia-bearing member 302. The timing gear 168 is arranged to complete one revolution during each cycle of the camera operation and performs the aforementioned indexing function by driving the indicia-bearing member 302 in a counterclockwise direction as viewed in FIG. 8. Thus, the indicia-bearing member 302 is adapted to be sequentially indexed one position in response to each camera operational cycle.

The timing gear 168 is driven by a motor driven gear train shown generally at 158 in FIGS. 5–9. The gear train at 158 in turn is driven by an electrically energized motor 160 which may be energized by an electrical battery 162 shown schematically in FIG. 11 and preferably included within the film cassette 44, as disclosed in U.S. Pat. No. 3,543,662 issued to Irving Erlickmann on Dec. 1, 1970, or form a separate battery source mounted within the camera. The gear train 158 includes a roller gear 314 in direct driving engagement with the pressure applying rollers 56 and 58, together with a roller drive gear 316. Thus, when the loading access door 40 is pivotally moved upwardly and latched into its closed operative position, the roller gear 314 is aligned and enmeshed with the roller drive gear 316 so that the rollers 56 and 58 are driven in a direction to cause the film units to be advanced between the rollers.

The ratchet wheel 310 includes a first set of drive teeth 318 spaced around an outer periphery of the ratchet wheel and arranged such that the drive pin 312 from the timing gear 168 engages a particular tooth and rotates the indicia-bearing member 312 through a predetermined arc defining an indexing segment before the drive pin 312 moves out of engagement therewith at the end of the predetermined arc. A second set of latching teeth 320 are spaced around an inner radius of the ratchet wheel 310 for engagement with the cassette pawl 306 which operates to capture the indicia-bearing member 302 after its rotation through the predetermined arc, when a film cassette 44 has been loaded into the film exposure chamber 31. The helical biasing spring 304 has one end portion suitably seated and secured to a hub portion of the indicia-bearing member 302, while the other end of the helical biasing spring 304 is grounded with respect to the second side mounting member 400. Thus, as is now readily apparent, the helical spring 304 becomes more tightly wound during each rotation of the indicia-bearing member 302 and the function of the cassette pawl 306 is to prevent reverse rotation of the indicia-bearing member 302 after the drive pin 312 on the timing gear 168 has been moved out of engagement of one of the drive teeth 318 of the ratchet wheel 310.

The cassette pawl 306 is preferably integrally molded and includes a central bore 322 about which it is rotatably disposed for a pivotal movement between a first position wherein it is disengaged from the second set of latching teeth 320 of the ratchet wheel 310 and a second position wherein it is engaged with the second set of latching teeth 320. The cassette pawl 306 includes a first depending arm portion 324 extending outwardly therefrom and having a latching edge 328 formed thereon for substantial and complete engagement with the underlying surface of a particular latching tooth of the ratchet wheel 310 when the cassette pawl 306 is in the second position, thereby preventing the reverse rotation of the indicia-bearing member 302 after the drive pin 312 is moved out of engagement with one of the drive teeth 318. A second depending arm portion 326 extends outwardly from the center bore 322 and is angularly displaced from the first depending arm 324 such that contact with the leading edge of the depending arm 326 causes the first arm 324 to be biased upwardly as viewed in FIG. 8 so that the latching edge 328 is substantially engaged along the underlying surface of one of the latching teeth 320. Thus, as long as the depending arm 324 remains biased upwardly, the indicia-bearing member 302 is substantially prevented from moving in a direction against the latching edge 328 and is thereby limited to unidirectional rotation, i.e., in a direction in which the leading edge of the latching teeth 320 is rotated away from the latching edge 328 of the arm 324.

Camera 10 is shown in FIG. 8 having an empty film receiving chamber 31 prior to the insertion of the film cassette 44 therein. It will be noted that the cassette pawl 306 is in the first position wherein the latching edge 328 of the pawl arm 324 is out of engagement with the ratchet wheel 310 and the depending arm 326 is lowered to extend into the film receiving chamber 31 within the path of travel of an entering film-laden cassette. When the loading access door 40 is pivotally moved downwardly into the unblocking position, an open end of the film receiving chamber 31 is exposed to receive the film cassette therein. Upon a slidably inserting the film cassette into the receiving chamber 31, the leading end wall of the film cassette, acting as an advance edge of the film cassette, strikes against the forward edge of the depending arm 326 and pivotally rotates the cassette pawl 306 clockwise as viewed in FIG. 8 into the second position. The pawl is upwardly biased by the leading end wall of the film cassette into engagement with the ratchet wheel 310 as a result of the pivotal movement of the cassette pawl 306, and the latching edge 328 is moved into position beneath the underlying edge of one of the latching teeth 320. The forward edge of the depending arm 326 slides upon the gradual sloping surface of the forward wall 50 of the film cassette during the continued insertion thereof until the film cassette arrives at a terminal position within the film receiving chamber 31, whereupon the latching edge 328 is in substantially full engagement with the underlying surface of an appropriate one of the latching teeth 320. Thus, the cassette pawl 306 is supportively retained in the second position by the sloping surface of the forward wall 50 of the film cassette until the cassette is removed from within the film receiving chamber 31. When the film cassette is removed from within the film receiving chamber 31, the cassette pawl 306 is permitted to pivotally move under the influence of a spring, not shown, in a counterclockwise direction as viewed in FIG. 8 thereby allowing the depending arm 324 to drop out of engagement with the ratchet wheel 310. The exposure counter 300 is considered to be in a starting select position when the film receiving chamber 31 is empty, and also immediately subsequent to the insertion of a new film cassette into the chamber.

Figure 9:
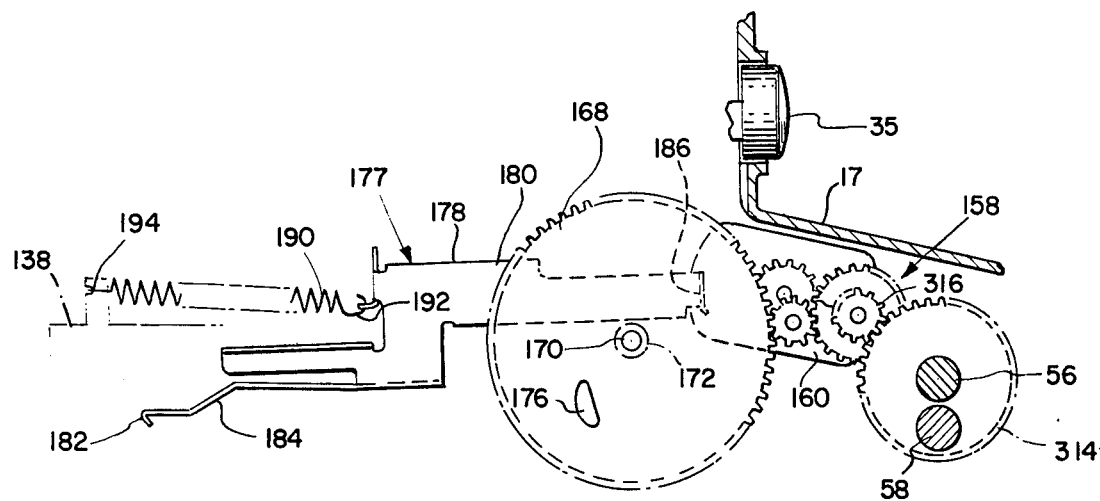
FIG. 9 is a side cross-sectional view of a portion of the apparatus for processing and advancing a film unit from the camera of FIG. 1.

The sequencing wheel 168 includes a profile cam 176 (see FIGS. 8 and 9) extending outwardly from the side thereof to drive a film advance mechanism as shown generally at 177 in FIG. 9.

The film advance mechanism 177 includes a reciprocating film advance member or device 178 for advancing the forwardmost film unit 46 in the film cassette 44 from the exposure position, through the film exit slot 52, and into the bite of the processing members 56 and 58. The main portion of film advance member 178 is preferably stamped from a thin sheet of metal such as stainless steel and includes an arm 184 attached to and extending rearwardly from a support section 180 to a hook end 182 for engaging a trailing edge of the forwardmost film unit 46. The support section 180 is retained for reciprocal translation with respect to the first mounting member 138 by means not shown. As the film advancing member 178 is advanced forwardly, by means to be described hereinafter, the trailing hook end 182 pulls on the trailing end of the film unit 46 to advance it through the withdrawal slot 52 and into the bite of processing members 56 and 58. Access for the film engaging hook 182 is provided by an elongated slot (not shown) at a trailing end corner of the film cassette 44. The free forward end of support section 180 defines a right angle bend having an end surface 186 adapted to follow the profile cam 176 on wheel 168. The film advance member 178 is resiliently biased to move in a direction away from the processing members 56 and 58 by a tension spring 190, one end of which at 192 connects to the support section 180 while the other end is grounded at 194 with respect to the first side mounting member 138. Thus, the combination of profile cam 176 and biasing spring 190 attached to support section 180 determine the reciprocal translation of the film advancing member 178 with respect to the first and second side mounting members 138, 140. The film advancing mechanism is more fully described in a copending application for U.S. Pat. No. 3,967,304 issued June 29, 1976, by Bruce K. Johnson, et al, entitled "Modular Constructed Sequencing System for Photographic Apparatus".

The shaft 146 of actuator 136 extends through a slot 202 of the slider member 200 so that the slider member 200 may be moved longitudinally within the housing 12 in parallel relation with an inwardly facing surface of the first side mounting member 138 between the limits defined by a semi-circular edge 204 and a vertical edge 206 of the slot 202. Slider member 200 additionally includes a large opening 208 defined vertically by upper and lower edges 210 and 212 respectively which extend longitudinally in the slider member 200 below the slot 202. The slider member 200 includes a mounting surface 216 to which the actuator button 35 may be fixedly connected to provide a manually actuated, forwardly biased, push button type switch for initiating the exposure of each of a predetermined number of film units 46 included within the assemblage stored in the film cassette 44. The slider member 200 will hereinafter be described as having three operative positions, as also described in a copending application for U.S. Pat. Ser. No. 648,673 entitled "Exposure Inhibiting Film Counter" by B. K. Johnson, filed Jan. 13, 1976 now abandoned.

Figure 15A:
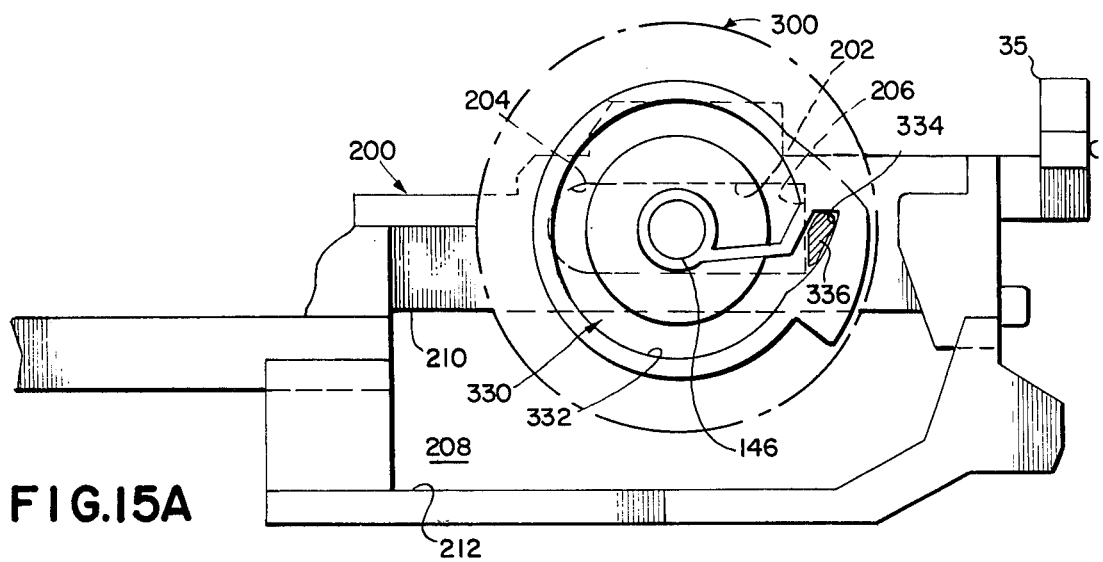
FIG. 15A - 15C are side cross-sectional views showing portions of the shutter button and film indexing apparatus at various stages during the process of this invention.
Figure 15B:
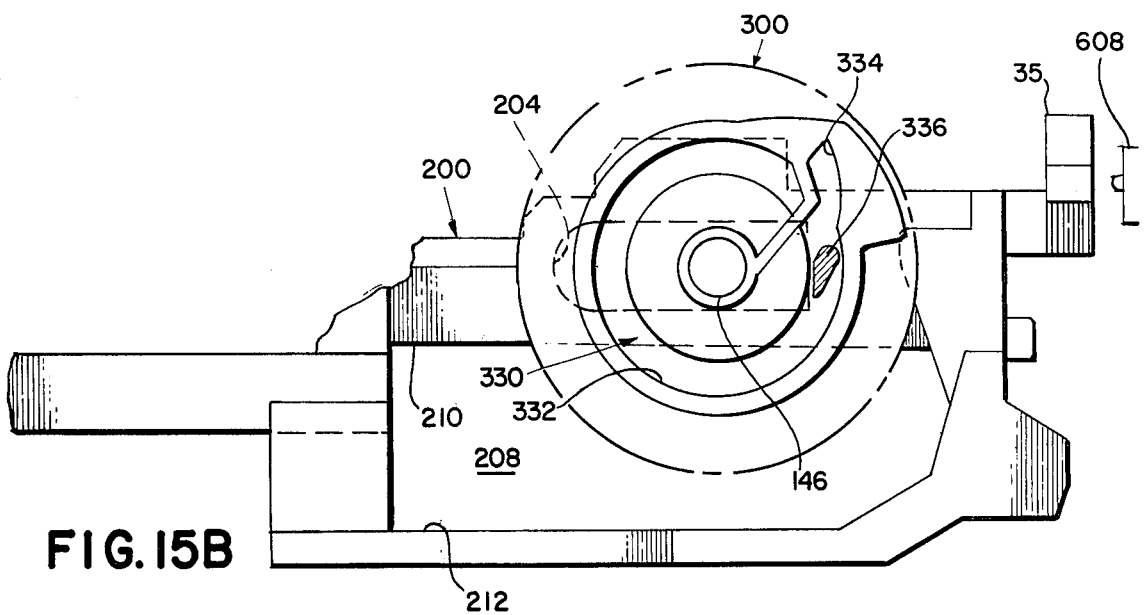
Figure 15C:
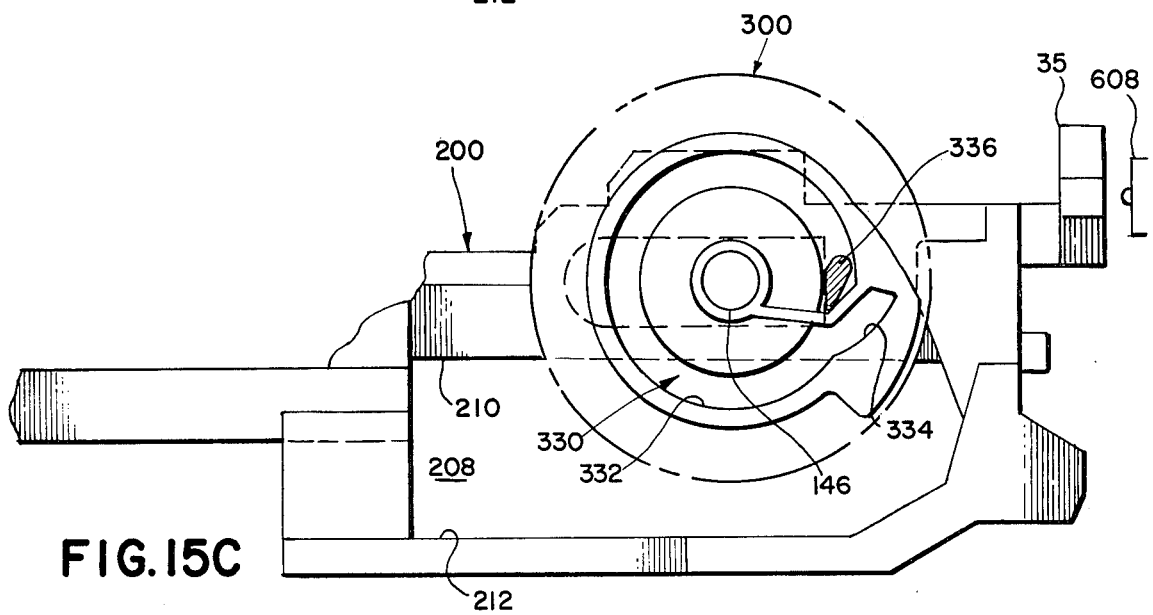

Movement of the slider member between the aforementioned three positions is limited by the counter 300 which includes a profile cam groove or surface 330 on the face thereof, opposite to the ratchet wheel 310 as best shown in FIGS. 15A-15C The cam groove 330 includes a main portion designated at 332 which follows a substantially uniform radius until it terminates, at a radially outwardly extending cam groove designated at 334. The cam groove 330 engages an integral laterally extending cam follower member 336 from the slider member 200 thereby driving the slider member 200 to its forwardmost position, when the cam groove 330 is rotated to its extreme clockwise position as shown in FIG. 15 A so that cam follower 336 is engaged within cam portion 334. As is now readily apparent, the slider member 200 is biased for forward translation by the spring 154 so that its associated cam follower 336 is normally held in engagement with the cam surface 330.

Figure 13:
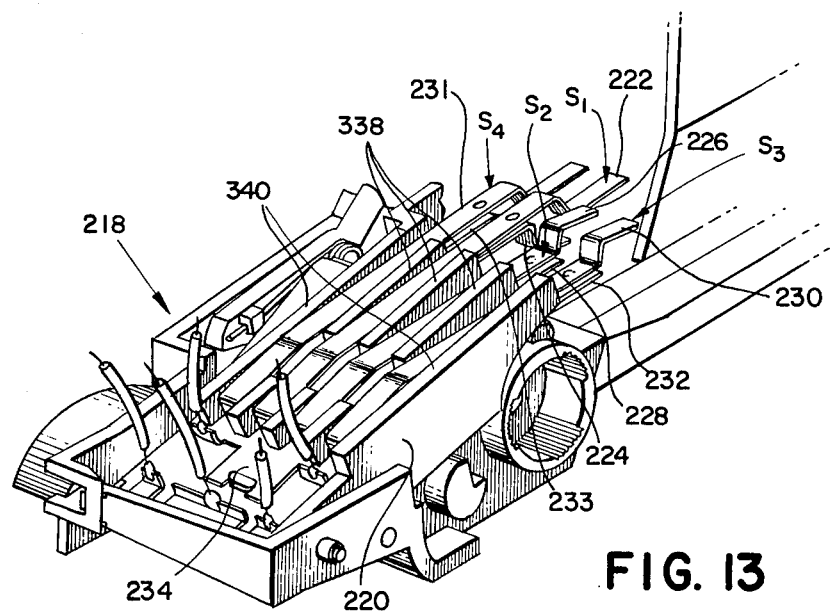
FIG. 13 is a perspective view of a portion of an electrical switching apparatus utilized in the camera of FIG. 1.
Figure 14A:
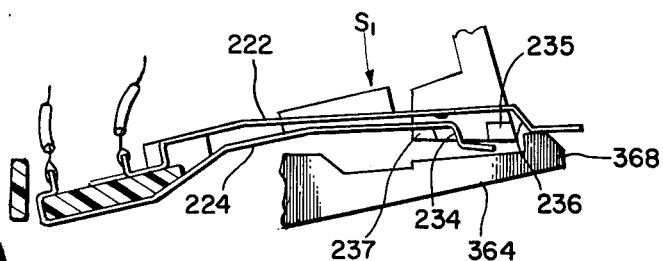
FIGS. 14A - 14C are side cross-sectional views showing various modes of operation for a portion of the switching apparatus of FIG. 13.
Figure 14B:
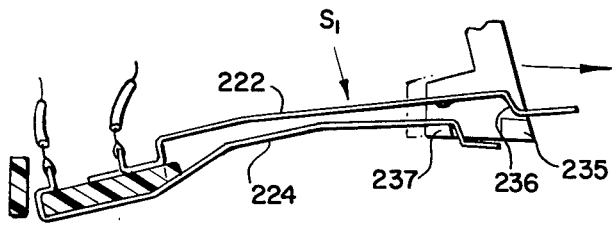
Figure 14C:
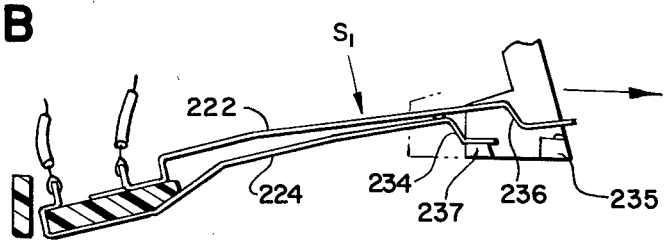

Referring now to FIGS. 13 and 14, there is shown generally at 218, a switchblock arrangement comprising an integrally molded baseblock member 220 to which are connected four pairs of spaced apart, resilient terminal leads defining four switches designated from left to right in FIG. 13 as S4, S1, S2 and S3, respectively. The base member 220 is preferably an integral structure made of plastic insulated material which has means for accommodating the connection of the resilient terminal leads. Each of the switch arrangements S1, S2, S3 and S4, must comprise a pair of leaves or switch arms constructed of resilient conductive material such as a beryllium copper alloy. The base member 220, in turn, includes a plurality of separator elements designated at 338 which in cooperation with side members 340 effectively align and separate the pairs of resilient terminal leaves of the switch arrangements S1, S2, S3 and S4. Upper switch leaves that are shown generally at 342 of the switch assembly 218 are formed by stamping or the like from a single sheet of metal having four switch leaves designates at 222, 226, 230, and 231, extending from a terminal position 234 which connects the upper switch leaves in common to the positive side of the battery by means of a conductive lead not shown. In like manner the lower switch leaves designated at 224, 228, 232, and 233 extend outwardly from the mounting block member 220 and are shorter than the corresponding upper leaves of the switch arrangement for reasons which will be subsequently explained in detail herein. In addition it can be seen that while the lower switch leaves 233 and 232 are separate elements, the terminal leaves 224 and 228 extend from a single conductive sheet which connects both leaves in common so as to functionally make switches S1 and S2 identical. However, while switches S1 and S2 are identical, they may be operated at different times during the camera cycle as later explained in regard to camera operation. Thus, switch S1 operationally comprises the upper resilient terminal leaf 222 in spaced apart relation to the lower resilient terminal leaf 224, which leaves are respectively bent at 236 and 234 for respective engagement with a pair of integrally molded spaced apart projecting members 235 and 237, extending laterally outward from the side of slider member 200, for cooperation, in a manner to be subsequently described in greater detail herein. Similarly, switch S2 comprises the upper resilient leaf 226 spaced apart from the lower resilient leaf 228 to operatively define a switch in parallel electrical connection with respect to switch S1 as shown in the schematic diagram of FIG. 11. In like manner, switch S3 comprises the upper resilient terminal leaf 230, biased in spaced apart relation to the lower terminal leaf 232 to provide a binary logic input signal from the battery 162 to the exposure sequencing control circuit 76. Switch S4 comprising the upper resilient terminal leaf 231 biased in spaced apart relation to the lower resilient terminal leaf 233 provides a second binary logic input signal from the battery 162 to the exposure sequencing control circuit 76. Thus, as is now readily apparent, switches S1 and S2 provide the requisite connection for the battery 162 to energize the exposure sequencing control circuit 76 as well as a motor and solenoid control circuit 238, together with their associated solenoid 102 and motor 160 while switches S3 and S4 provide the requisite binary logic input signals from the battery to operate the exposure sequencing and control circuit in a manner to be subsequently described in greater detail herein.

Referring now back to FIG. 7, there is shown an integrally molded depending arm portion 240 extending from the actuator 136 for engagement with the upper resilient terminal leaves 226 and 230 of respective switches S2 and S3 upon counterclockwise rotation of the actuator 136 about the shaft 142. Thus, counterclockwise rotation of the actuator 136 against the bias of tension spring 154 operates to deflect the upper resilient terminal leaves 226 and 230 from engagement with their respective lower terminal leaves 228 and 232 so as to open switches S2 and S3. In the preferred embodiment, the leading edge profile of depending arm portion 240 is configured in a manner operating to open switch S3 prior to opening switch S2 when rotated in a counterclockwise direction, while conversely permitting switch S2 to close prior to switch S3 when rotated in a clockwise direction. Actuator member 136 additionally includes an integrally molded cam follower portion 242 extending laterally outward from the side thereof for cooperative engagement with a second profile cam 252 on the internal surface of sequencing wheel 168. Thus, as is readily apparent, clockwise rotation of sequencing wheel 168 operates to rotate profile cam 252 into engagement with cam follower portion 242 to rotate actuator 136 in a counterclockwise direction about the shaft 142 and against the bias of tension spring 154.

Referring now to FIGS. 8 and 18, there is shown generally at 350, a film loading access door pawl 350 having a center bore 352 rotatably engaged to a laterally extending integral shaft 354 from the side wall member 138. Opposite the center bore 352 there is provided an integral laterally extending shaft 356 which in turn extends through a helical spring 358 and then through the center bore 322 of the cassette pawl 306 for engagement with a corresponding hole 370 in the side wall member 140. Helical spring 358 operates to resiliently bias the door pawl 350 for rotation in a clockwise direction as viewed in FIG. 8 about its center bore 352 while at the same time biasing the cassette pawl 306 for counterclockwise rotation about its respective center bore 322. The door pawl 350 includes a first depending arm portion 360, the outward end of which terminates in a cam follower portion 362, which is stationed for engagement with a cam surface 372 upon closure of the film loading access door 40. The door pawl 350 additionally includes a second depending arm portion 364 extending outward from the center bore 352 and terminating at leading edge hook 368, adjacent the upper leaf 222 of switch S1 when the film access door 40 is pivoted to the open position and the slider member 200 is translated to its forwardmost position by the counter 300 upon release of the cassette pawl 306 in the aforementioned manner. Thus, as is now readily apparent, opening the film access door 40, while the film receiving chamber 31 is empty, results in the door pawl 360 being rotated by the spring 358 in a clockwise direction as viewed in FIGS. 8 and 18 so that the leading edge hook 368 engages the upper terminal leaf 222 to open switch S1 as shown in FIG. 14 A. In addition, the leading edge hook 368 is stationed in the path of movement of the projection 235 from the slider member 200 so as to inhibit translation of the slider member 200 as may result from depressing the button 35. Pivoting the film loading access door 40 into the closed position results in a cam surface 372 engaging the cam follower 362 of the door pawl 350 so as to rotate the door pawl in a counterclockwise direction about its center bore 352 as shown in FIGS. 8 and 18 In this manner closure of the film loading access door operates to rotate the leading edge hook 368 both out of engagement with the upper terminal 222 of switch S1 so as to effectively close switch S1 while at the same time moving the hook 368 out of the path of translation of projection 235 so as to permit the depression of button 35 to initiate an exposure cycle. Thus, as is now readily apparent, the door pawl 350 not only operates to open the switch S1 in concert with opening of the film loading access door 40, but also operates to inhibit the accidental depression of the button 35 subsequent to the insertion of a film cassette within the film receiving chamber and prior the closing of the film loading access door 40.

Referring back to FIG. 2, there is additionally shown a shock stabilizing means including an inertia member 254 connected for rotation with respect to the baseblock casting 14 by a pivot pin 258. The inertial member 254 includes a main body portion 256 from which extends upwardly an integral arm portion 260, the outward tip of which is located in the locus of travel of the laterally extending pin 126 from the walking beam. Inertia member 254 is biased for rotation in a counterclockwise direction about pivot pin 258 by a leaf spring 262, one end of which engages the main body portion 256 at 264 and the other end of which is grounded with respect to the baseblock casting at 266. In addition, the main body portion 114 of the latch includes an integral depending arm portion 270 extending downwardly therefrom in overlying relation with respect to the pivot pin 258 so as to inhibit the inertia member 254 from sliding axially off the pivot pin 258 regardless of the latch position.

Figure 16:
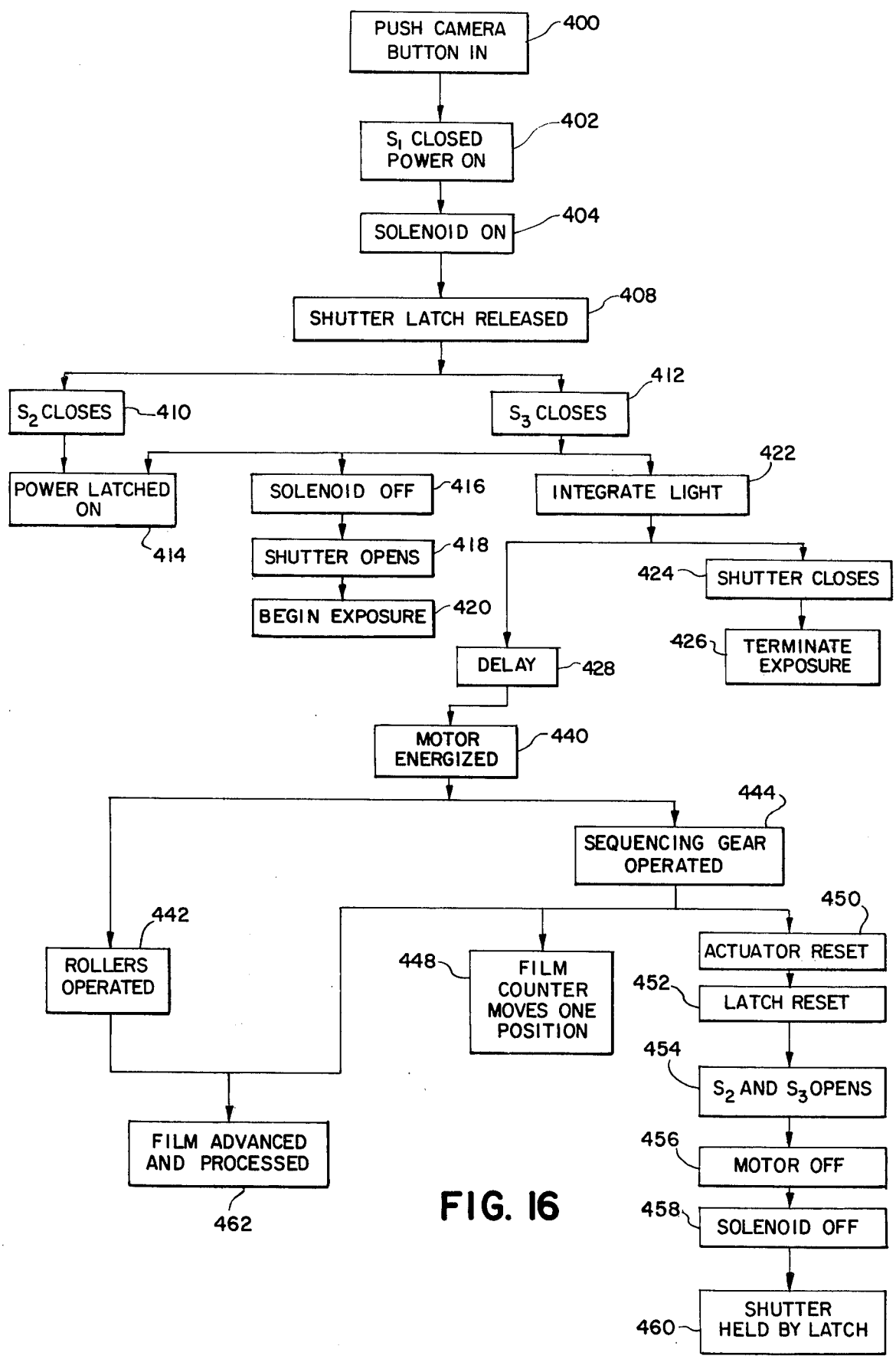
FIG. 16 is a block diagram sequentially illustrating various operational modes for the camera of FIG. 1.

The overall photographic operation of the camera system will now be explained with regard to FIGS. 16 and 17. Prior to describing the overall photographic operation, it should be noted that the camera 10 is preferably designed for both ambient and flash operation. However, since flash operation is not necessary to understanding the present invention, it will not be discussed herein. Thus, assuming now that a fresh film cassette has been loaded into the film receiving chamber 31, and that the film loading access door 40 has been pivoted into the closed position, camera actuation can be initiated by depressing the button 35 as designated in Block 400. Depressing the actuator button 35 attached to the mounting surface 216 of slider member 200 operates to displace the slider rearwardly along the shaft 146. In this manner, the integrally molded projections 235 and 237 from the slider member 200, respectively, engage bent portions 236 and 234 of respective terminal leaves 222 and 224 so as to displace the terminal leaves into contact with each other as shown in FIG. 14 C, thereby closing switch S1 and energizing control circuits 76 and 238 as designated in Block 402. The solenoid, 102 is also energized in correspondence with the control circuits as designated in Block 404 so as to effect an inward displacement of plunger 104, thereby rotating the walking beam 84 in a counterclockwise direction so as to displace the pin 126 out of engagement with the latching surfaces 122 and 124 and into alignment with the latch release slot 125 as shown in FIG. 3. The latch member 112 is thereafter released as designated in Block 408 through rotation in a counterclockwise direction about the pivot pin 116 as effected by the actuator member 136 which arm 150 engages the edge surface 134 of the latch. The actuator member 136 is rotated in a counterclockwise direction by the tension spring 154 so as to overcome the force of tension spring 128.

Clockwise rotation of the actuator member 136 also operates to bring the depending arm portion 240 thereof sequentially out of engagement with the upper resilient terminal leaves 226 and 230 of respective switches S2 and S3. The upper terminal leaves 226 and 230 are thereafter deflected into respective engagement with the lower terminal leaves 228 and 232, to respectively close the switches S2 and S3 as respectively designated in Blocks 410 and 412. The closing of switch S2 latches power to the system, as noted in Block 414, while the closing of switch S3 operates to connect a binary input logic signal from the battery 162 to the exposure and sequencing control circuit 76, which in turn effects the de-energization of the solinoid 102 to open the shutter and begin exposure as depicted in Blocks 416, 418 and 420. In the preferred mode of operation switch S2 is arranged to close prior to switch S3 and as is readily apparent, once the switches S2 and S3 have been closed, the user may release the button 35 so as to permit the slider member 200 to translate forward under the influence of tension spring 154. The resilient terminal leaves 222 and 224 of switch S1 also spring apart in correspondence with forward translation of slider member 200. Thus, the terminal leaves 222 and 224 of switch S1 are arranged to be opened and closed in correspondence respectively with the depression and release of button 35 so as to collectively define a push-button type of switch.

As is now readily apparent, the aforementioned counterclockwise rotation of the latch member 112 under the influence of member 136 and its associated tension spring 154 also simultaneously operates to unlatch the walking beam 84 to facilitate clockwise rotation thereof under the influence of compression spring 104. Simultaneous application of the binary input logic signal through the exposure and sequencing control circuit 76 by the switch S3 operates to ultimately effect a switching operation by the motor and solenoid control circuit 238 to de-energize the solenoid 102 and thereby commence an exposure interval as designated in the Blocks 416, 418 and 420. The shutter blade elements 32 and 34 are thereafter moved by the walking beam 84 and compression spring 104 in directions which operate to progressively enlarge the effective aperture over the light-entering exposure opening 18. Rotation of the walking beam 84, as previously discussed, effects a simultaneous linear and angular movement of the shutter blade elements 32 and 34 about the pivot pin 78 so that the photocell sweep secondary apertures 64 and 66 define a progressively enlarging aperture over the photo-responsive element 72. Thus, from the instant the photographic cycle is initiated, upon the de-energization of solenoid 102, the photo-responsive element 72 provides a time varying response corresponding the intensity of seen light incident thereon. The capacitor 74 operates in conjunction with the photoresponsive element 72 to provide an input to the exposure and sequencing control circuit 76 which is representative of the time integration of scene light intensity incident to the photo-responsive element 72 as designated by Block 422. Upon reaching a pre-determined exposure of the forwardmost film unit 46, the exposure and sequencing control circuit 76 signals the motor and solenoid control circuit 238 to again energize the solenoid 102 to retract the plunger 104 therein and rotate the walking beam 84 in a counterclockwise direction back to the scene light blocking arrangement as shown in FIG. 4 to terminate the exposure interval as designated in Blocks and 424 and 426.

Simultaneously with the shutter blade closing command signal, there is activated a delay signal as designated at Block 428, which in turn signals the motor and solenoid control circuit 238 to energize the motor 160 after sufficient time is allowed for the shutter blades to close. Motor energization, as designated in Block 440, operates to rotate the sequencing wheel 168 in a clockwise direction by way of the motor driven gear train 158. Rotation of the sequencing gear 168 as shown in Block 444 operates to rotate the profile cam 176 thereon in engagement with the end surface 186 defined by the right angle bend at the free forward end of the film advance support section 180. The end surface 186 is held in engagement with the cam 176 by the rearward force finished to the film advancement mechanism 177 by the biasing tension spring 190. As the film advancement mechanism 170 is advanced forwardly by the cam 176 on wheel 168, the trailing hook end 182 pulls on the trailing end of the film unit 46 to advance through the withdrawal slot 52 into the bite of pressure applying rollers 56 and 58. The film unit 46 is thereafter processed by the pressure applying rollers 56 and 58 and ejected from the camera apparatus 10 by way of the film withdrawal slot 42 in the film loading access door 40 as designated generally by the Blocks 442 and 462. Continued rotation of the sequencing wheel 168 operates to move the profile cam 176 out of engagement with the end surface 186 of the film advance mechanism 177 thereby permitting the film advance mechanism to retract rearwardly under the influence of tension spring 190.

The aforementioned rotation of the sequencing gear 168 also operates to bring the drive pin 312 into engagement with the drive teeth 318 so as to index the counter 300 in the aforementioned manner as best designated in Block 448. Continued rotation of the sequencing gear 168 subsequent to the ejection of a processed film unit operates to rotate the profile cam 252 into engagement with the integral cam follower portion 242 of actuator member 136 so as to rotate the actuator member in a counterclockwise direction as viewed in FIGS. 5–8 against the biasing influence of tension spring 154. Counterclockwise rotation of actuator member 136 in turn operates to rotate the depending arm portion 240 into sequential engagement with upper terminal leaves 226 and 230 of respective switches S2 and S3. Again in the preferred mode, switch S3 is arranged to be opened prior to switch S2 in order that the binary logic input control signal may be disconnected prior to the de-energization of the control circuits 76 and 238. Thus, the actuator member 136 is reset and the switches S2 and S3 are opened as depicted in Blocks 450 and 454 respectively. As is now readily apparent, opening the switches S2 and S3 de-energizes the motor 160 which continues to coast until profile cam 252 on wheel 168 has been rotated out of engagement with cam follower 242 on actuator member 136. In this manner, both the motor and solenoid are turned off, as depicted in Blocks 456 and 458 respectively.

Counterclockwise rotation of the actuator member 136 and its associated arm 150 accommodates clockwise rotation of the latch member 112 about pivot pin 116 under the operative influence of tension spring 128. Thus, the latch release slot 125 is rotated past the laterally extended pin 126 from the walking beam 84 so that the latch member 112 assumes the position as shown in FIG. 2 and designated by Block 452. Once the latch is rotated into the latching position, switches S2 and S3 are arranged to open so as to cause the solenoid 112 to de-energize as shown in Block 458 and effect a limited clockwise rotation of the walking beam 84 under the operative influence of compression spring 104 so that pin 126 engages latch surfaces 122 and 124. In this manner, the shutter blade mechanism is automatically re-latched in concert with the opening of switches S2 and S3 as designated in Block 460 so as to de-energize the control circuits 76 and 238 together with the solenoid 104 and motor 160. Should the user fail to release the button 35, the exposure and sequencing circuit 76 will nevertheless operate to de-energize the solenoid 102 and motor 160 in the aforementioned manner.

To complete the description of the camera operation, the film loading operation will now be described with regard to FIG. 17. Since many of the camera functions are identical to those described in regard to FIG. 16, the same numerical identification of such identical functions will be employed in FIG. 17 where possible. As noted in FIG. 17, upon exposing and processing the final film unit in a film cassette, the counter 300 is moved to its final position as depicted in Block 472. Subsequent opening of the film access door 40 as noted in Block 476, permits rotation of the door pawl 350 in a clockwise direction under the operative influence of spring 358 to the position as shown in FIG. 8 as previously described. Subsequent removal of the film cassette from the film receiving chamber 31 releases the cassette pawl 306 which disengages from the ratchet wheel 310 so as to permit the counter 300 to be returned to its original position under the operative influence of spring 304 as noted in Blocks 481 and 482. The latter advances the slider member 200 and its associated push button 35 to its forwardmost position as designated in Block 484 and as shown in FIG. 15A. In addition, switch S4 is also closed by a coaction of the projections 235 and 237 on resilient leaves 233 and 231 in a manner not shown by drawings but depicted in Block 486.

Subsequent insertion of a new film cassette into the film receiving chamber will operate to reset the cassette pawl, thereby inhibiting return of the counter 300 to its initial position, subsequent to advancement of the drive pin 312 in the aforementioned manner. Upon closing the film loading access door, the door pawl 350 is pivoted out of engagement with the upper terminal leaf 222 of switch S1 so as to close switch S1 as designated in Block 492. Closing the switch S1, in turn, activates the camera as in the previously described photographic cycle to energize the solenoid as shown in Block 404. Then, as in the aforementioned photographic operations, the energization of the solenoid moves the shutter blade arrangement to release the latch 112 and actuator member 136 as noted respectively in Blocks 408 and 409. Releasing the actuator 136 also operates in the aforementioned manner to close the switches S2 and S3 as depicted in Block 500. The latter switch operation latches power to the system and triggers the exposure and sequencing control circuit 76.

Turning for the moment to the circuit diagram on FIG. 11, it should be noted that the switch S4 provides a dark slide eject signal to the exposure and sequencing control circuit 76 so as to essentially bypass normal exposure operations. That is, the switch S4 signals the exposure and sequencing control circuit to maintain the solenoid 102 in an energized condition while simultaneously initiating energization of the motor 160 as depicted in Block 440. Thereafter, with the exception of the control of the counter 300, and the slider member 200 as explained below, the camera operates in accordance with the remainder of the cycle as described with regard to FIG. 16 so as to operate the film advance mechanism and pressure applying rollers to advance the uppermost film unit, which in this case would be a dark slide, to index the film counter, and to subsequently reset the camera to its initial start position.

Figure 17:
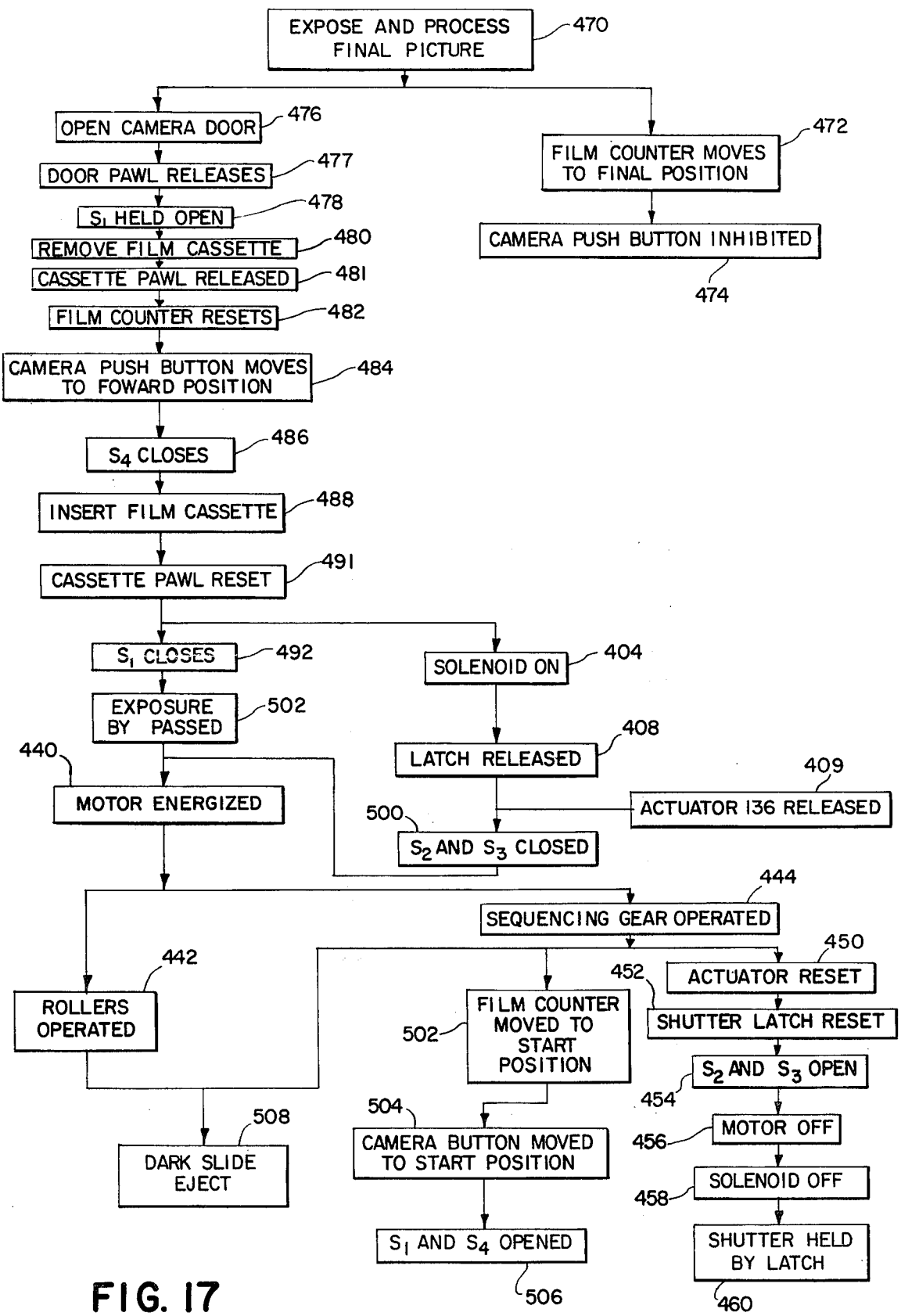
FIG. 17 is a block diagram illustrating other various operational modes for the camera of FIG. 1.

When the counter 300 is indexed to its initial start position, depicted in Block 502 of FIG. 17, it operates by way of the cam surface 332 and cam follower 336 to displace the slider member 200 inwardly to its intermediate position as noted in Block 504 at which position switches S1 and S4 are opened. As will now be readily understood, subsequent to the return of the slider member 200 to its intermediate position, which opens switches S1 and S4, the actuator member 136 is returned to its initial position, which resets the shutter latch 112 and opens switches S2 and S3. Opening of the latter switches disconnects the battery 162 from the control circuits and releases the shutter blades to their latched position as noted in Block 460. Thus the entire camera operation has been herein described to provide an understanding of the necessity of applying the method of this invention to the aforementioned camera.

Should the camera apparatus 10 be shaken, dropped, or otherwise shocked in a manner causing walking beam 84 to rotate in a counterclockwise direction against the operative influence of compression spring 104, there could occur an unlatching of the shutter blade mechanism in the manner previously described. Thus, as a precaution against the accidental unlatching of the shutter blade mechanism, there is provided the inertia member 254 for engaging the pin 126 of the walking beam 84 upon a sudden shocking of the walking beam 84. As should be readily understood, the inertia member 254 must either be arranged to initially engage the pin 126 or be slightly spaced apart therefrom to allow the walking beam 84 to move slightly before engaging inertia member 254. In this manner, kinetic energy imparted to the walking beam upon the shocking thereof is subsequently transferred to an inertia member 254 by the pin 126. Transfer of the kinetic energy from the walking beam 84 to the inertia member 254 operates to stop the walking beam 84, while imparting a clockwise rotation to the inertia member 254 as shown in FIG. 10. The inertia member 254 is resiliently biased by the lease spring 262 to rebound back and engage the pin 126 of the walking beam, thereby again transferring the remaining kinetic energy from the inertia member back to the walking beam so as to inhibit the walking beam from accidentally moving into the unlatched position.

In this manner, the shutter blade mechanism is prohibited from accidentally unlatching as a result of sudden shock, while during normal operation the inertia member 254 is simply rotated in a counterclockwise direction out of the way by the walking beam pin 126 upon the energization of solenoid 102.

Figure 19:
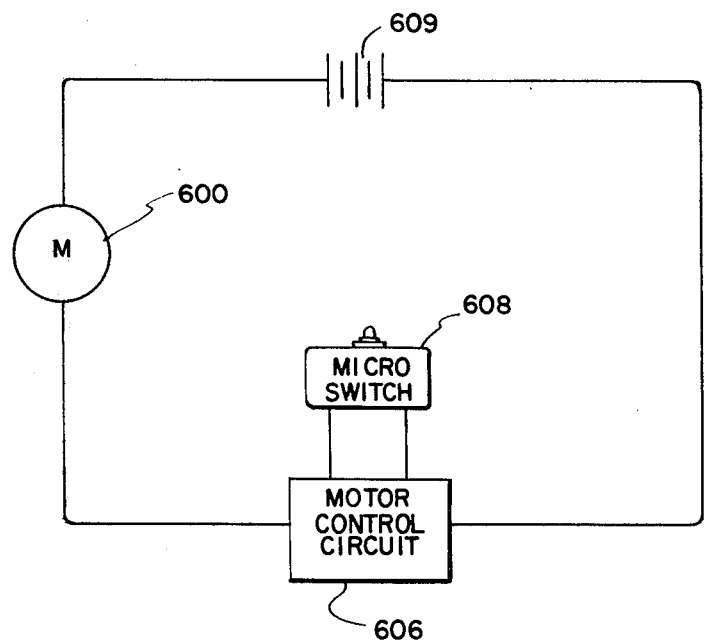
FIG. 19 is a block diagram of the motor control.

However, under severe or repeated shock, the walking beam 84 may nevertheless still accidentally unlatch. The problem may be particularly acute when the cameras are shipped from their place of manufacture, at which time there may be expected to occur severe shocks during transit. The method of this invention is therefore utilized by the manufacturer to adjust the control system of the camera apparatus prior to shipment so that even if the walking beam 84 would have unlatched from the latch member 112, and the switches S2 and S3 accidentally close as a result thereof, the user will still be able to insert a film cassette into the film receiving chamber without incurring a dark slide advancement prior to closing the film loading access door 40. Therefore, upon completion of the manufacture of the camera, the film loading access door 40 is opened as shown in FIG. 8 and a driving gear as shown at 602 is enmeshed with the roller drive gear 316 so as to drive the gear train 158 and its associated sequencing gear 168 regardless of actuation of the motor 160. The gear 602 may be powered from an external motor 600, which is shown schematically in FIG. 19 as being powered from a battery 604, although other sources of energy may be equally suitable. The motor 600 is controlled through a motor control circuit 606 and a microswitch 608 operatively associated with the motor control circuit. The microswitch 608 in turn is stationed adjacent the button 35 so as to change state when the button 35 and its associated slider member 200 are translated from their forwardmost position as shown in FIG. 15 A to their intermediate position as shown in FIG. 15B. For purposes of our discussion, the microswitch 608 will be considered as being in a closed or shorted state when contacted by the pushbutton 35 in its forwardmost position and will be considered as changing to a nonconductive or open position responsive to the pushbutton 35 disengaged from the microswitch upon translation to the intermediate position. As is now readily apparent, opening the film loading access door 40 while the film receiving chamber 31 remains empty, results in the slider member 200 and its associated button 35 translating to the forwardmost position to engage and close the microswitch as shown in FIG. 15 A. Thus, with the microswitch initially shorted, the control circuit 606 operates to energize the motor 600 which in turn drives the gear train 158 and its associated sequencing gear 168, by way of the drive gear 602. Rotation of the sequencing wheel 168 in turn operates to rotate the profile cam 176 thereon into engagement with the end surface 186 defined by the right angle bend at the free forward end of the film advance support section 180. Thus, the film advance mechanism 170 is advanced forwardly by the cam 176 on the wheel 168 in the aforementioned manner. Continued rotation of the sequencing wheel 168 operates to move the profile cam 176 out of engagement with the end surface 186 of the film advance mechanism 177, thereby permitting the film advance mechanism to retract rearwardly under the influence of tension spring 190.

Rotation of the sequencing gear 168 also operates to rotate the drive pin 312 with the drive teeth 318 around the outside of the ratchet wheel 310 so as to index the ratchet wheel in the aforementioned manner Indexing the ratchet wheel 310 causes the slider member 200 and its associated button 35 to translate rearwardly to its intermediate position as a result of the coaction between the cam follower 336 along the cam surface 332 as previously described. Withdrawal of the button 35 as shown in FIG. 15B to the intermediate position results in an opening of the microswitch 608, which does not affect the motor control circuit's energization of the motor 600. Thus, the motor 600 continues to drive the sequencing gear 168 until the drive pin 312 is rotated out of engagement with the drive teeth 318 around the outside of the ratchet wheel 310. Whereas the film receiving chamber is empty, the cassette pawl 306 is biased out of engagement with the inside teeth 320 of the ratchet wheel 310 so that the ratchet wheel 310 is rotated back to its initial position as shown in FIG. 8 by the spring 304 in the aforementioned manner. Resetting the counter 300 in this manner operates to translate the slider member 200 and its associated button 35 to its extreme forward position by virtue of the cam follower 336 being engaged by the outwardly extending portion 334 of the cam surface 330. Thus, the button 35 operates to again close the microswitch 608 which in turn signals the control circuit to de-energize the motor 600 so as to stop the rotation of the sequencing wheel 168. The motor 600 and its associated drive gear 602 may thereafter be disengaged from the roller drive gear 316, after which the film loading access door 40 can be closed and the camera packed for shipment.

Now during shipment, should the walking beam 84 be accidentally shocked into releasing the latch member 112 so as to close the switches S2 and S3, there will occur only a brief period of energization for the motor 160 upon the first-time insertion of a fresh cassette by the user. As is now readily apparent, the motor 160 will be immediately energized through the switches S2 and S3, upon the insertion of a fresh cassette therein and prior to the closing of the film loading access door 40. Were the camera not adjusted in the aforementioned manner, the sequencing wheel 168 would therefore rotate through a complete cycle, causing the film advance mechanism 177 to reject the dark slide even before the user had an opportunity to close the film loading access door 40. Should the user see a dark slide 48 advancing from the camera before he has a chance to close the film loading access door, he might react by slamming the film loading access door closed and jamming it into the advancing dark slide. The method of this invention however avoids this possibility by advancing the sequencing gear 168 to a position wherein it is past the film advancing operation so that even though the motor 160 may be energized immediately upon insertion of a film cassette within the film receiving chamber 31, there will not be ejected a dark slide 48 prior to closing the film loading access door. Thus, if the walking beam 84 should accidentally unlatch from the latching member 112, all that can possibly occur upon the insertion of a fresh cassette within the film receiving chamber is a momentary energization of the motor 160 to return the actuator member 136 to its initial position, which in turn resets the shutter latch that opens switches S2 and S3. opening the switches S2 and S3 in turn disconnects the battery power to the system, which power cannot be reinstated until the film loading access door 40 is moved into the latched position in the aforementioned manner.

In one embodiment for the aforementioned process, it may be preferable for the motor control circuit 606 to delay deenergization of the motor 600 for a select time period subsequent to the closure of the microswitch 608. In this manner, insertion of a fresh cassette within the film receiving chamber will result in a shorter period of energization for the motor 160 thereby prohibiting the motor from developing a sufficient back EMF to cause the camera to continue into a subsequent exposure cycle prior to closure of the film loading access door.

Although the method of this invention is described as not operating to unlatch the shutter blades prior to shipment, it is readily apparent that the shutter blades could be intentionally unlatched prior to shipment by any suitable means including the deliberate jarring or shocking of the camera.

Since certain changes may be made in the abovedescribed embodiment without departing from the scope of the invention herein involved, it is intended that all matter contained in the above description or shown in the accompanying drawings shall be interpreted as illustrative and not in a limiting sense.

What is claimed is:

1. A method of preparing a camera having a user operated start actuator and a normally latched shutter for shipment so as to avoid initial abortive camera operation by a user in the event of shock impact during shipment of sufficient force to cause shutter unlatching, said camera when energized and actuated by a user having a cycle of operation normally responsive to the unlatching of said shutter comprising a plurality of events occurring in a predetermined sequence and including the event of relatching the shutter after a predetermined period of time has elapsed following the occurrence of a given event of said plurality of events, said camera further being of the type wherein if said shutter should become unlatched through shock impact, subsequent energization of said camera without actuation of said actuator by the user will result in said camera automatically performing said cycle including said given event as well as said relatching event, said method comprising the steps of:
effecting the operation of at least a portion of said cycle including said given event; and
interrupting said effected operation prior to the lapse of said predetermined period of time following the occurrence of said given event.

2. The method of claim 1 wherein said operation of at least a portion of said cycle is initiated without causing said shutter to become unlatched so that said camera may be shipped with its shutter latched and initial energization of said camera by the user subsequent to an accidental unlatching of the shutter during shipment will only cause said shutter to be relatched without causing said given event to occur prior to the user's actuation of said cycle.

3. The method of claim 2 wherein said camera is of the type having drive means for automatically performing at least a portion of said cycle of operation including said given event which is the advancement of a film unit from its exposure plane and said effecting of the operation of at least a portion of said automatic cycle comprises the steps of:
effecting the operation of said camera drive means so that said camera drive means at least performs said given film advancing event.

4. The method of claim 3 wherein said start actuator includes a manually actuable shutter button arranged to assume a select position responsive to said camera being in an unloaded condition with respect to film and wherein said shutter button is moved from said select position responsive to said camera drive means operation, and thereafter returned to said select position responsive to continued drive means operation prior to the lapse of said predetermined period of time following the occurrence of said given film advancing event while the camera remains in an unloaded condition with respect to film, said interrupting of said initiated operation comprising the steps of:
monitoring the position of said shutter button in a manner which will detect movement of said shutter button from the select position responsive to drive means operation and which will additionally detect movement of said shutter button back to the select position prior to the lapse of said predetermined period of time following the occurrence of said given film advancing event; and
terminating the operation of said camera drive means in response to detection of said shutter button movement back to said select position.

5. The method of claim 4 wherein the operation of said camera drive means is effected by stationing a drive apparatus outside said camera in driving engagement with said camera drive means and thereafter effecting the operation of said external drive apparatus.

6. The method of claim 4 wherein the position of said shutter button is monitored by way of a microswitch stationed adjacent said shutter button in a manner whereby the microswitch changes from one select state to another select state in response to shutter button movement from said select position and thereafter changes from said other select state to said one select state in response to shutter button movement back to said select position, and the termination of the operation of said camera drive means is effected by means of a control circuit which ultimately stops said camera drive means in response to said microswitch changing from said other select state to said one select state.

7. The method of claim 4 wherein the operation of said camera drive means is effected by a motor stationed outside said camera in driving engagement with said camera drive means, the position of said shutter button is monitored by way of a microswitch stationed adjacent the shutter button in a manner whereby the microswitch changes from one select state to another select state in response to shutter button movement from said select position and thereafter changes from said other select state to said one select state in response to shutter button movement back to said select position, and the termination of the operation of the drive means is effected by means of a control circuit which operates to deenergize the motor in response to said microswitch changing from said other select state to said one select state after which the motor is disengaged from driving engagement with the drive means.

* * * * *